United States Patent
Dodgson et al.

(10) Patent No.: US 8,392,682 B2
(45) Date of Patent: Mar. 5, 2013

(54) STORAGE SECURITY USING CRYPTOGRAPHIC SPLITTING

(75) Inventors: David Dodgson, Lansdale, PA (US); Joseph Neill, Malvern, PA (US); Ralph Farina, Downingtown, PA (US); Edward Chin, Newtown Square, PA (US); Albert French, Schwenksville, PA (US); Scott Summers, Collegeville, PA (US); Robert Johnson, Pottstown, PA (US)

(73) Assignee: Unisys Corporation, Blue Bell, PA (US)

( * ) Notice: Subject to any disclaimer, the term of this patent is extended or adjusted under 35 U.S.C. 154(b) by 928 days.

(21) Appl. No.: 12/336,564

(22) Filed: Dec. 17, 2008

(65) Prior Publication Data
US 2010/0153670 A1 Jun. 17, 2010

(51) Int. Cl.
G06F 12/00 (2006.01)
(52) U.S. Cl. ...................................................... 711/163
(58) Field of Classification Search .................. None
See application file for complete search history.

(56) References Cited

U.S. PATENT DOCUMENTS

| | | | | |
|---|---|---|---|---|
| 6,950,818 B2* | 9/2005 | Dennis et al. | | 711/163 |
| 7,272,848 B1* | 9/2007 | Meyer et al. | | 726/1 |
| 7,533,157 B2* | 5/2009 | Hu et al. | | 709/219 |
| 7,676,672 B2* | 3/2010 | Phillips et al. | | 713/155 |
| 7,971,261 B2* | 6/2011 | Pestoni | | 726/27 |
| 2003/0188153 A1 | 10/2003 | Demoff et al. | | |
| 2004/0024962 A1 | 2/2004 | Chatterjee et al. | | |
| 2004/0133577 A1 | 7/2004 | Miloushev et al. | | |
| 2005/0165972 A1 | 7/2005 | Miyata et al. | | |
| 2005/0273686 A1 | 12/2005 | Turner et al. | | |
| 2007/0079083 A1 | 4/2007 | Gladwin et al. | | |

(Continued)

FOREIGN PATENT DOCUMENTS

EP 0249091 A2 12/1987

(Continued)

OTHER PUBLICATIONS

Rabin, M.O.: "Efficient Dispersal of Information for Security, Load Balancing, and Fault Tolerance"; Journal of the Association for Computing Machinery, ACM, New York, NY US; vol. 36, No. 2, Apr. 1, 1989; pp. 335-348; CP000570108; ISSN: 0004-5411; p. 336: line 9-line 13; p. 336, Line 41-Line 50; p. 340, Line 6-Line 30.

(Continued)

Primary Examiner — Hiep Nguyen
(74) Attorney, Agent, or Firm — Richard J. Gregson

(57) ABSTRACT

Methods and systems for administrative management of a secure data storage network are disclosed. One system includes a secure storage appliance configured to host a plurality of volumes, each volume associated with a plurality of shares stored on a corresponding plurality of physical storage devices and having a plurality of volume management settings, wherein each volume is accessible by a group of one or more users, each user assigned an administrative access level, the volume management settings are editable by a first user from the group of one or more users associated with the volume and assigned an administrative access level sufficient to edit the volume management settings, and the volume management settings are inaccessible by a second user from outside the group of one or more users associated with the volume and assigned an administrative access level at least equal to that of the first user.

20 Claims, 24 Drawing Sheets

U.S. PATENT DOCUMENTS

| | | |
|---|---|---|
| 2007/0160198 A1 | 7/2007 | Orsini et al. |
| 2008/0147821 A1 | 6/2008 | Dietrich et al. |
| 2008/0183975 A1 | 7/2008 | Foster et al. |

FOREIGN PATENT DOCUMENTS

| | | |
|---|---|---|
| EP | 1818847 A2 | 8/2007 |
| WO | WO2005041045 A2 | 5/2005 |
| WO | WO2007120429 A2 | 10/2007 |
| WO | WO2007120438 A2 | 10/2007 |
| WO | WO2008118227 A2 | 10/2008 |

OTHER PUBLICATIONS

Robert A. Johnson: "MLS-Net and SecureParser: A New Method for Securing and Segregating Network Data" [Online] Jul. 8, 2007: XP002582437 4th International Symposium on Risk Management and Informatics: WMSI 2007, Orlando Florida, USA.

Sabre A. Schnitzer et al.: "Secured Storage Using SecureParser" [Online] 2005, pp. 135-140, XP002582438; ISBN: 1-59593-233-X workshop on Storage Security and Survivability, Fairfax VA.

* cited by examiner

| | |
|---|---|
| Security Administrator | Global Security Settings |
| Domain Administrator | Domain Account Settings |
| Administrator | Volume Definition, Groups |
| Audit Administrator | Audit Log Editing |
| Crypto Administrator | Key Access |
| User | Data Access |
| Guest | Managed Device Status |

FIG. 24

STORAGE SECURITY USING CRYPTOGRAPHIC SPLITTING

RELATED APPLICATIONS

The present disclosure claims the benefit of commonly assigned U.S. patent application Ser. No. 12/272,012, entitled "BLOCK LEVEL DATA STORAGE SECURITY SYSTEM", filed 17 Nov. 2008. The present disclosure also claims the benefit of commonly assigned U.S. patent application Ser. No. 12/336,558, entitled "DATA RECOVERY USING ERROR STRIP IDENTIFIERS", filed 17 Dec. 2008.

The present disclosure is related to commonly assigned, and concurrently filed, U.S. patent application Ser. No. 12/336,559 entitled "STORAGE SECURITY USING CRYPTOGRAPHIC SPLITTING", filed 17 Dec. 2008. The present disclosure is also related to commonly assigned, and concurrently filed, U.S. patent application Ser. No. 12/336,562, entitled "STORAGE SECURITY USING CRYPTOGRAPHIC SPLITTING", filed 17 Dec. 2008. The present disclosure is related to commonly assigned, and concurrently filed, U.S. patent application Ser. No. 12/336,568, entitled "STORAGE SECURITY USING CRYPTOGRAPHIC SPLITTING", filed 17 Dec. 2008. These related applications are incorporated by reference herein in its entirety as if it is set forth in this application.

TECHNICAL FIELD

The present disclosure relates to data storage systems, and security for such systems. In particular, the present disclosure relates to storage security in systems implementing cryptographic splitting.

BACKGROUND

Modern organizations generate and store large quantities of data. In many instances, organizations store much of their important data at a centralized data storage system. It is frequently important that such organizations be able to quickly access the data stored at the data storage system. In addition, it is frequently important that data stored at the data storage system be recoverable if the data is written to the data storage system incorrectly or if portions of the data stored at the repository is corrupted. Furthermore, it is important that data be able to be backed up to provide security in the event of device failure or other catastrophic event.

The large scale data centers managed by such organizations typically require mass data storage structures and storage area networks capable of providing both long-term mass data storage and access capabilities for application servers using that data. Some data security measures are usually implemented in such large data storage networks, and are intended to ensure proper data privacy and prevent data corruption. Typically, data security is accomplished via encryption of data and/or access control to a network within which the data is stored. Data can be stored in one or more locations, e.g. using a redundant array of inexpensive disks (RAID) or other techniques.

One example existing mass data storage system 10 is illustrated in FIG. 1. As shown, an application server 12 (e.g. a database or file system provider) connects to a number of storage devices $14_1$-$14_N$ providing mass storage of data to be maintained accessible to the application server via direct connection 15, an IP-based network 16, and a Storage Area Network 18. Each of the storage devices 14 can host disks 20 of various types and configurations useable to store this data.

The physical disks 20 are made visible/accessible to the application server 12 by mapping those disks to addressable ports using, for example, logical unit numbering (LUN), internet SCSI (iSCSI), or common internet file system (CIFS) connection schemes. In the configuration shown, five disks are made available to the application server 12, bearing assigned letters I-M. Each of the assigned drive letters corresponds to a different physical disk 20 (or at least a different portion of a physical disk) connected to a storage device 14, and has a dedicated addressable port through which that disk 20 is accessible for storage and retrieval of data. Therefore, the application server 12 directly addresses data stored on the physical disks 20.

A second typical data storage arrangement 30 is shown in FIG. 2. The arrangement 30 illustrates a typical data backup configuration useable to tape-backup files stored in a data network. The network 30 includes an application server 32, which makes a snapshot of data 34 to send to a backup server 36. The backup server 36 stores the snapshot, and operates a tape management system 38 to record that snapshot to a magnetic tape 40 or other long-term storage device.

These data storage arrangements have a number of disadvantages. For example, in the network 10, a number of data access vulnerabilities exist. An unauthorized user can steal a physical disk 20, and thereby obtain access to sensitive files stored on that disk. Or, the unauthorized user can exploit network vulnerabilities to observe data stored on disks 20 by monitoring the data passing in any of the networks 15, 16, 18 between an authorized application server 12 or other authorized user and the physical disk 20. The network 10 also has inherent data loss risks. In the network 30, physical data storage can be time consuming, and physical backup tapes can be subject to failure, damage, or theft.

To overcome some of these advantages, systems have been introduced which duplicate and/or separate files and directories for storage across one or more physical disks. The files and directories are typically stored or backed up as a monolith, meaning that the files are logically grouped with other like data before being secured. Although this provides a convenient arrangement for retrieval, in that a common security construct (e.g. an encryption key or password) is related to all of the data, it also provides additional risk exposure if the data is compromised. Furthermore, similar data is typically stored encrypted with a common encryption key, thereby rendering the data vulnerable if the key is obtained.

For these and other reasons, improvements are desirable.

SUMMARY

In accordance with the following disclosure, the above and other problems are solved by the following:

In a first aspect, a system for administrative management of a secure data storage network are disclosed. The system includes a secure storage appliance configured to host a plurality of volumes, each volume associated with a plurality of shares stored on a corresponding plurality of physical storage devices and having a plurality of volume management settings, wherein each volume is accessible by a group of one or more users, each user assigned an administrative access level, the volume management settings are editable by a first user from the group of one or more users associated with the volume and assigned an administrative access level sufficient to edit the volume management settings, and the volume management settings are inaccessible by a second user from outside the group of one or more users associated with the volume and assigned an administrative access level at least equal to that of the first user.

In a second aspect, a system for administrative management of a secure data storage network is disclosed. The system includes a secure storage appliance configured to host a plurality of volumes, each volume associated with a plurality of shares stored on a corresponding plurality of physical storage devices and having a plurality of volume management settings. The system further includes a security group definition designating a plurality of security groups, each security group associated with a volume and assigned to a security administrator, wherein volume management settings of a volume associated with one of the plurality of security groups are editable by the security administrator associated with the security group.

In a third aspect, a method of accessing administrative settings in a secure storage appliance is disclosed. The method includes receiving a request for administrative access to a volume managed by the secure storage appliance, the volume associated with a plurality of shares stored on a plurality of physical storage devices, the request including an identifier of an administrative user. The method also includes checking an administrative access level to determine access rights of the administrative user. The method further includes responding to the request for administrative access based on an outcome of checking the administrative access level and generating a log record of the received request for administrative access. In the method, the administrative user lacks access rights to a second volume different from the volume associated with a share stored on the plurality of physical storage devices.

BRIEF DESCRIPTION OF THE DRAWINGS

FIG. 24 shows a hierarchical arrangement of administrative access rights useable in a secure data storage network, according to a possible embodiment of the present disclosure.

DETAILED DESCRIPTION

Figure 1:
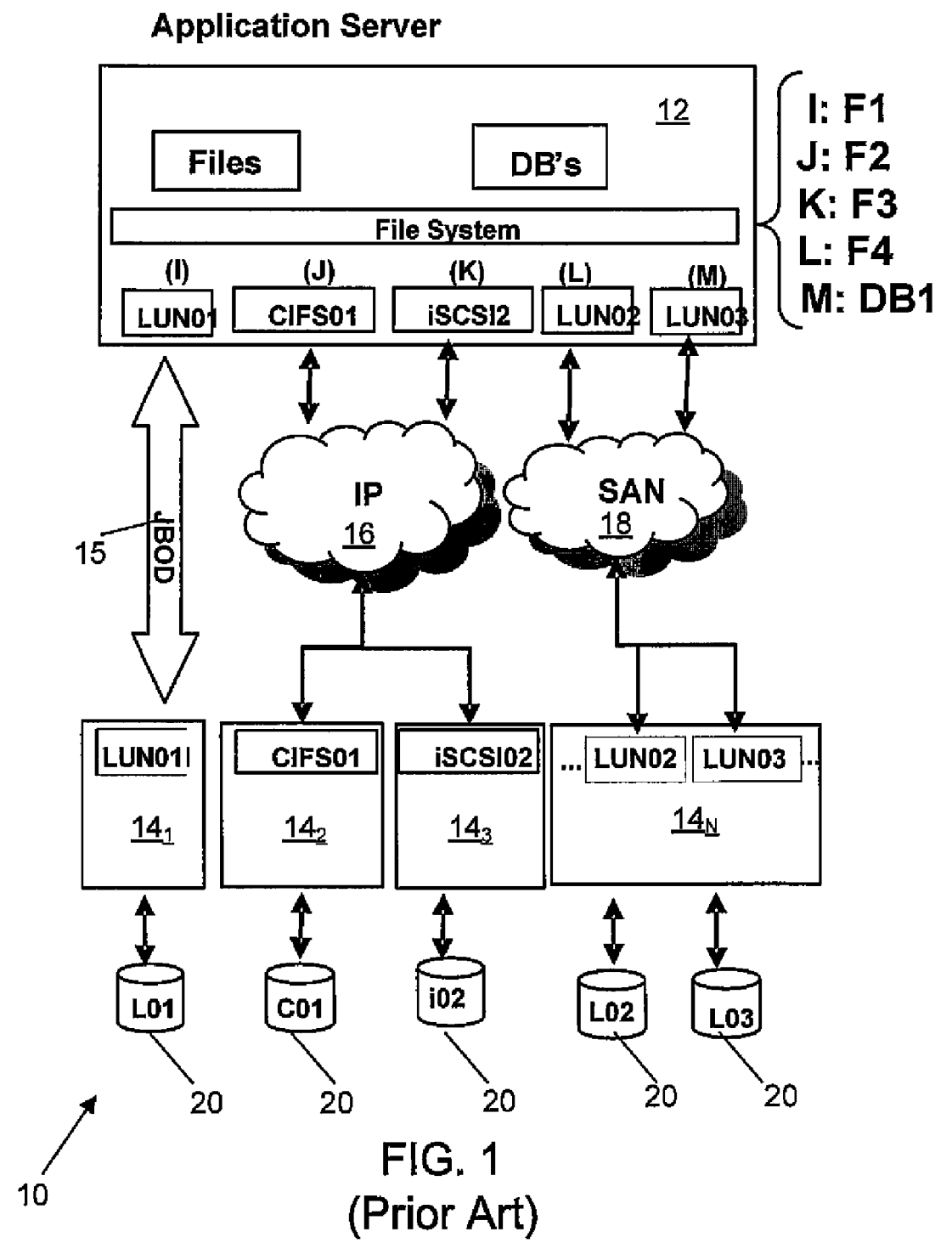
FIG. 1 illustrates an example prior art network providing data storage.
Figure 2:
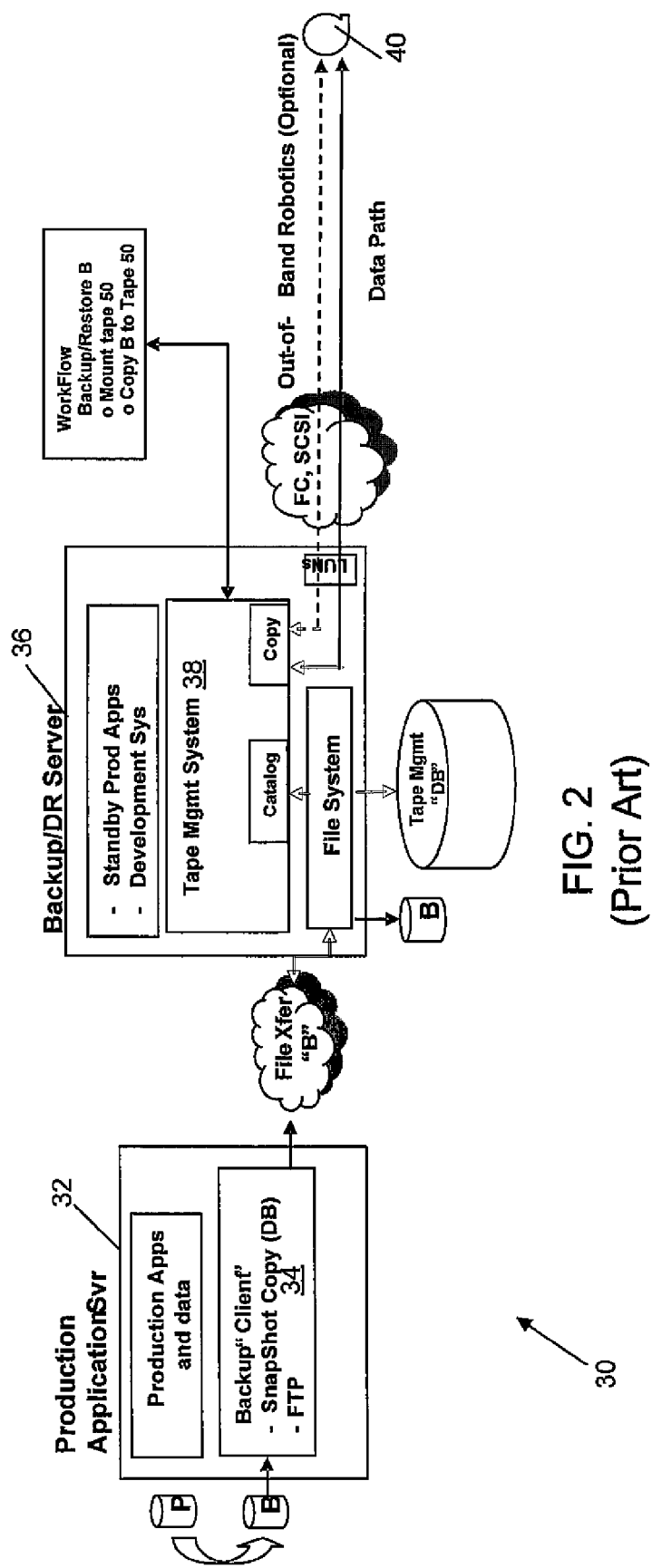
FIG. 2 illustrates an example prior art network providing data backup capabilities.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to a storage security for a block-level data storage system. By block-level, it is intended that the data storage and security performed according to the present disclosure is not performed based on the size or arrangement of logical files (e.g. on a per-file or per-directory level), but rather that the data security is based on individual read and write operations related to physical blocks of data. In various embodiments of the present disclosure, the data managed by the read and write operations are split or grouped on a bitwise or other physical storage level. These physical storage portions of files can be stored in a number of separated components, and encrypted. The split, encrypted data improves data security for the data "at rest" on the physical disks, regardless of the access vulnerabilities of physical disks storing the data. This is at least in part because the data cannot be recognizably reconstituted without having appropriate access and decryption rights to multiple, distributed disks. The access rights limitations provided by such a system also makes deletion of data simple, in that deletion of access rights (e.g. encryption keys) provides for effective deletion of all data related to those rights.

The storage security elements of the present disclosure provide for selective data presentation to users, as well as distribution of administrative roles among a number of administrative users. These features prevent concentration of access of data in a single individual or group of individuals, thereby improving overall data security. The storage security elements of the present disclosure also encompass systems for updating security in the systems disclosed herein, such as by updating and replacing encryption keys used to secure data.

The various embodiments of the present disclosure are applicable across a number of possible networks and network configurations; in certain embodiments, the block-level data storage security system can be implemented within a storage area network (SAN) or Network-Attached Storage (NAS). Other possible networks in which such systems can be implemented exist as well.

Figure 3:
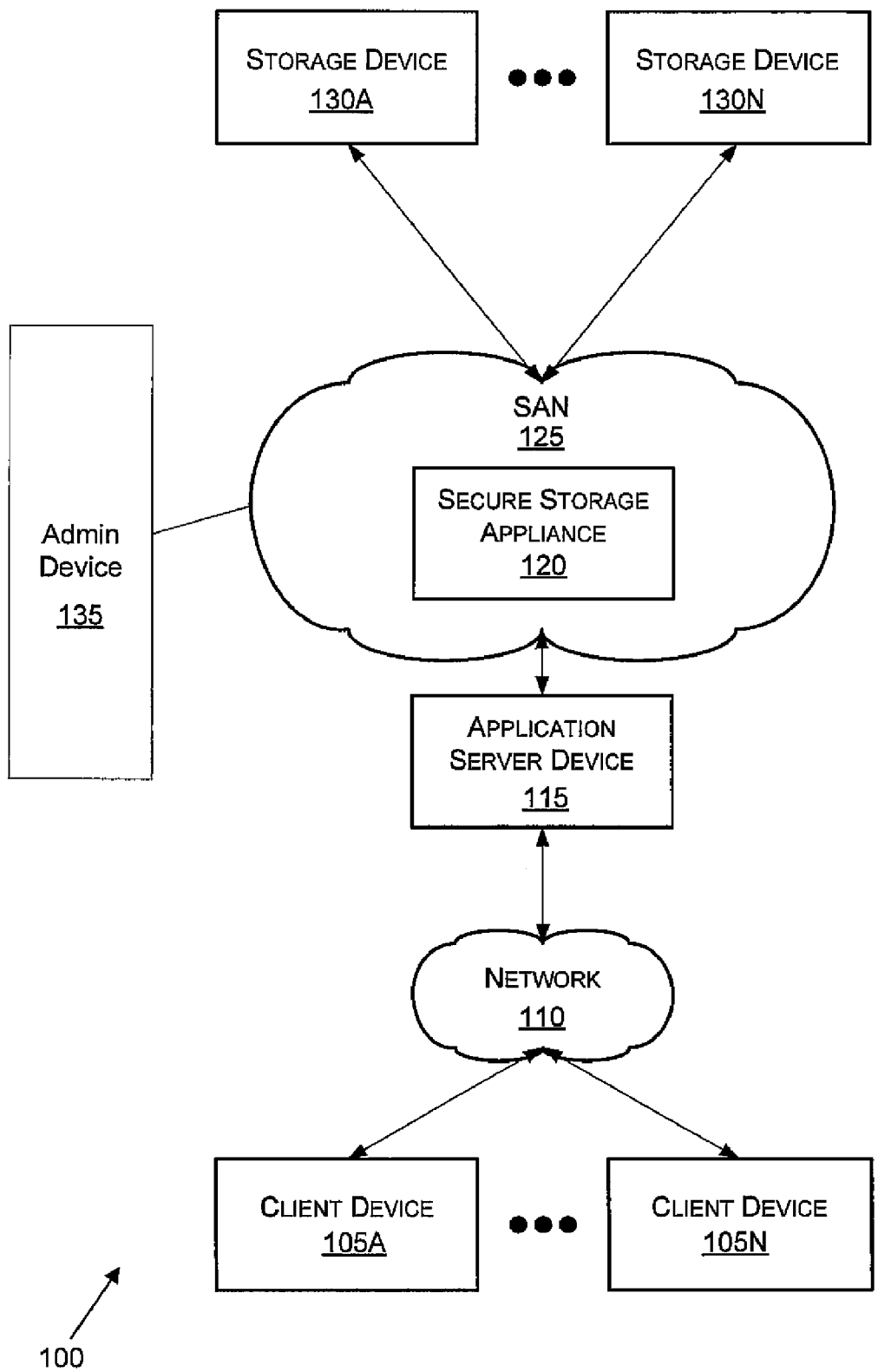
FIG. 3 illustrates a data storage system according to a possible embodiment of the present disclosure.

Referring now to FIG. 3, a block diagram illustrating an example data storage system 100 is shown, according to the principles of the present disclosure. In the example of FIG. 3, system 100 includes a set of client devices 105A through 105N (collectively, "client devices 105"). Client devices 105 can be a wide variety of different types of devices. For example, client devices 105 can be personal computers, laptop computers, network telephones, mobile telephones, television set top boxes, network televisions, video gaming consoles, web kiosks, devices integrated into vehicles, mainframe computers, personal media players, intermediate network devices, network appliances, and other types of computing devices. Client devices 105 may or may not be used directly by human users.

Client devices 105 are connected to a network 110. Network 110 facilitates communication among electronic devices connected to network 110. Network 110 can be a wide variety of electronic communication networks. For example, network 110 can be a local-area network, a wide-area network (e.g., the Internet), an extranet, or another type of communication network. Network 110 can include a variety of connections, including wired and wireless connections. A variety of communications protocols can be used on network 110 including Ethernet, WiFi, WiMax, Transfer Control Protocol, and many other communications protocols.

In addition, system 100 includes an application server 115. Application server 115 is connected to the network 110, which is able to facilitate communication between the client devices 105 and the application server 115. The application server 115 provides a service to the client devices 105 via network 110. For example, the application server 115 can provide a web application to the client devices 105. In another example, the application server 115 can provide a network-attached storage server to the client devices 105. In another example, the application server 115 can provide a database access service to the client devices 105. Other possibilities exist as well.

The application server 115 can be implemented in several ways. For example, the application server 115 can be implemented as a standalone server device, as a server blade, as an intermediate network device, as a mainframe computing device, as a network appliance, or as another type of computing device. Furthermore, it should be appreciated that the application server 115 can include a plurality of separate computing devices that operate like one computing device. For instance, the application server 115 can include an array of server blades, a network data center, or another set of separate computing devices that operate as if one computing device. In certain instances, the application server can be a virtualized application server associated with a particular group of users, as described in greater detail below in FIG. 18.

The application server 115 is communicatively connected to a secure storage appliance 120 that is integrated in a storage area network (SAN) 125. Further, the secure storage appliance 120 is communicatively connected to a plurality of storage devices 130A through 130N (collectively, "storage devices 130"). Similar to the secure storage appliance 120, the storage devices 130 can be integrated with the SAN 125.

The secure storage appliance 120 can be implemented in several ways. For example, the secure storage appliance 120 can be implemented as a standalone server device, as a server blade, as an intermediate network device, as a mainframe computing device, as a network appliance, or as another type of computing device. Furthermore, it should be appreciated that, like the application server 115, the secure storage appliance 120 can include a plurality of separate computing devices that operate like one computing device. In certain embodiments, SAN 125 may include a plurality of secure storage appliances. Each of secure storage appliances 214 is communicatively connected to a plurality of the storage devices 130. In addition, it should be appreciated that the secure storage appliance 120 can be implemented on the same physical computing device as the application server 115.

The application server 115 can be communicatively connected to the secure storage appliance 120 in a variety of ways. For example, the application server 115 can be communicatively connected to the secure storage appliance 120 such that the application server 115 explicitly sends I/O commands to secure storage appliance 120. In another example, the application server 115 can be communicatively connected to secure storage appliance 120 such that the secure storage appliance 120 transparently intercepts I/O commands sent by the application server 115. On a physical level, the application server 115 and the secure storage appliance 120 can be connected via most physical interfaces that support a SCSI command set. For example, Fibre Channel and iSCSI interfaces could be used.

The storage devices 130 can be implemented in a variety of different ways as well. For example, one or more of the storage devices 130 can be implemented as disk arrays, tape drives, JBODs ("just a bunch of disks"), or other types of electronic data storage devices.

In various embodiments, the SAN 125 is implemented in a variety of ways. For example, the SAN 125 can be a local-area network, a wide-area network (e.g., the Internet), an extranet, or another type of electronic communication network. The SAN 125 can include a variety of connections, including wired and wireless connections. A variety of communications protocols can be used on the SAN 125 including Ethernet, WiFi, WiMax, Transfer Control Protocol, and many other communications protocols. In certain embodiments, the SAN 125 is a high-bandwidth data network provided using, at least in part, an optical communication network employing Fibre Channel connections and Fibre Channel Protocol (FCP) data communications protocol between ports of data storage computing systems.

The SAN 125 additionally includes an administrator device 135. The administrator device 135 is communicatively connected to the secure storage appliance 120 and optionally to the storage devices 130. The administrator device 135 facilitates administrative management of the secure storage appliance 120 and to storage devices. For example, the administrator device 135 can provide an application that can transfer configuration information to the secure storage appliance 120 and the storage devices 130. In another example, the administrator device 135 can provide a directory service used to store information about the SAN 125 resources and also centralize the SAN 125.

In various embodiments, the administrator device 135 can be implemented in several ways. For example, the administrator device 135 can be implemented as a standalone computing device such as a PC or a laptop, or as another type of computing device. Furthermore, it should be appreciated that, like the secure storage appliance 120, the administrator device 135 can include a plurality of separate computing devices that operate as one computing device.

Figure 4:
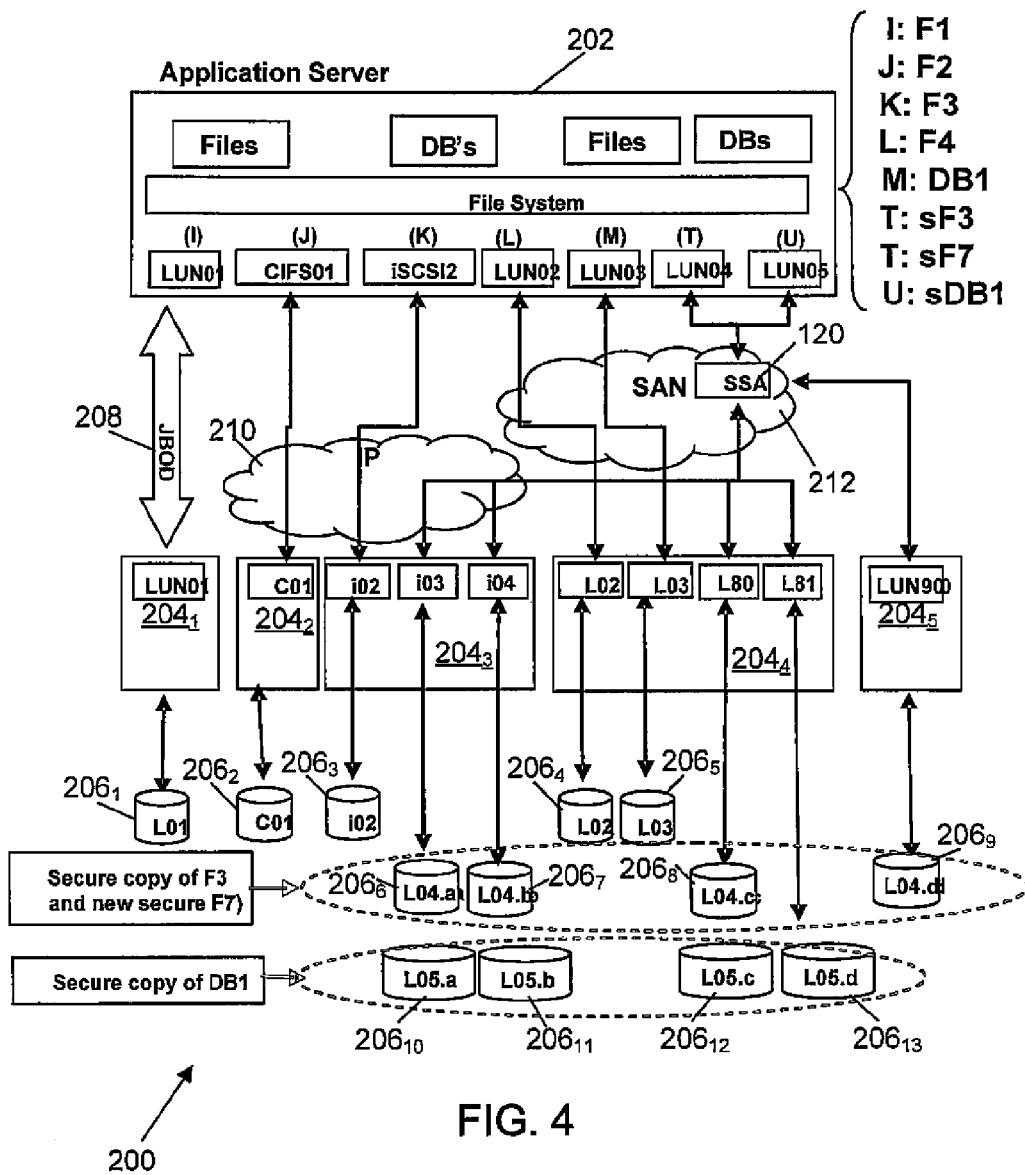
FIG. 4 illustrates a data storage system according to a further possible embodiment of the present disclosure.

Now referring to FIG. 4, a data storage system 200 is shown according to a possible embodiment of the present disclosure. The data storage system 200 provides additional security by way of introduction of a secure storage appliance and related infrastructure/functionality into the data storage system 200, as described in the generalized example of FIG. 3.

In the embodiment shown, the data storage system 200 includes an application server 202, upon which a number of files and databases are stored. The application server 202 is generally one or more computing devices capable of connecting to a communication network and providing data and/or application services to one or more users (e.g. in a client-server, thin client, or local account model). The application server 202 is connected to a plurality of storage systems 204. In the embodiment shown, storage systems $204_{1-5}$ are shown, and are illustrated as a variety of types of systems including direct local storage, as well as hosted remote storage. Each storage system 204 manages storage on one or more physical storage devices 206. The physical storage devices 206 generally correspond to hard disks or other long-term data storage devices. In the specific embodiment shown, the JBOD storage system $204_1$ connects to physical storage devices $206_1$, the NAS storage system $204_2$ connects to physical storage device $206_2$, the JBOD storage system $204_3$ connects to physical storage devices $206_{3-7}$, the storage system $204_4$ connects to physical storage devices $206_{8-12}$, and the JBOD storage system $204_5$ connects to physical storage device $206_{13}$. Other arrangements are possible as well, and are in general a matter of design choice.

In the embodiment shown, a plurality of different networks and communicative connections reside between the application server 202 and the storage systems 204. For example, the application server 202 is directly connected to storage system $204_1$ via a JBOD connection 208, e.g. for local storage. The application server 202 is also communicatively connected to storage systems $204_{2-3}$ via network 210, which uses any of a number of IP-based protocols such as Ethernet, WiFi, WiMax, Transfer Control Protocol, or any other of a number of communications protocols. The application server 202 also connects to storage systems $204_{4-5}$ via a storage area network (SAN) 212, which can be any of a number of types of SAN networks described in conjunction with SAN 125, above.

A secure storage appliance 120 is connected between the application server 202 and a plurality of the storage systems 204. The secure storage appliance 120 can connect to dedicated storage systems (e.g. the JBOD storage system $204_5$ in FIG. 4), or to storage systems connected both directly through the SAN 212, and via the secure storage appliance 120 (e.g. the JBOD storage system $204_3$ and storage system $204_4$). Additionally, the secure storage appliance 120 can connect to systems connected via the network 210 (e.g. the JBOD system $204_3$). Other arrangements are possible as well. In instances where the secure storage appliance 120 is connected to a storage system 204, one or more of the physical storage devices 206 managed by the corresponding system is secured by way of data processing by the secure storage appliance. In the embodiment shown, the physical storage devices $206_{3-7}$, $206_{10-13}$ are secured physical storage devices, meaning that these devices contain data managed by the secure storage appliance 120, as explained in further detail below.

Generally, inclusion of the secure storage appliance 120 within the data storage system 200 may provide improved data security for data stored on the physical storage devices. As is explained below, this can be accomplished, for example, by cryptographically splitting the data to be stored on the physical devices, such that generally each device contains only a portion of the data required to reconstruct the originally stored data, and that portion of the data is a block-level portion of the data encrypted to prevent reconstitution by unauthorized users.

Through use of the secure storage appliance 120 within the data storage system 200, a plurality of physical storage devices 208 can be mapped to a single volume, and that volume can be presented as a virtual disk for use by one or more groups of users. In comparing the example data storage system 200 to the prior art system shown in FIG. 1, it can be seen that the secure storage appliance 120 allows a user to have an arrangement other than one-to-one correspondence between drive volume letters (in FIG. 1, drive letters I-M) and physical storage devices. In the embodiment shown, two additional volumes are exposed to the application server 202, virtual disk drives T and U, in which secure copies of data can be stored. Virtual disk having volume label T is illustrated as containing secured volumes F3 and F7 (i.e. the drives mapped to the iSCSI2 port of the application server 202, as well as a new drive), thereby providing a secured copy of information on either of those drives for access by a group of users. Virtual disk having volume label U provides a secured copy of the data held in DB1 (i.e. the drive mapped to LUN03). By distributing volumes across multiple disks, security is enhanced because copying or stealing data from a single physical disk will generally be insufficient to access that data (i.e. multiple disks of data, as well as separately-held encryption keys, must be acquired)

Figure 5:
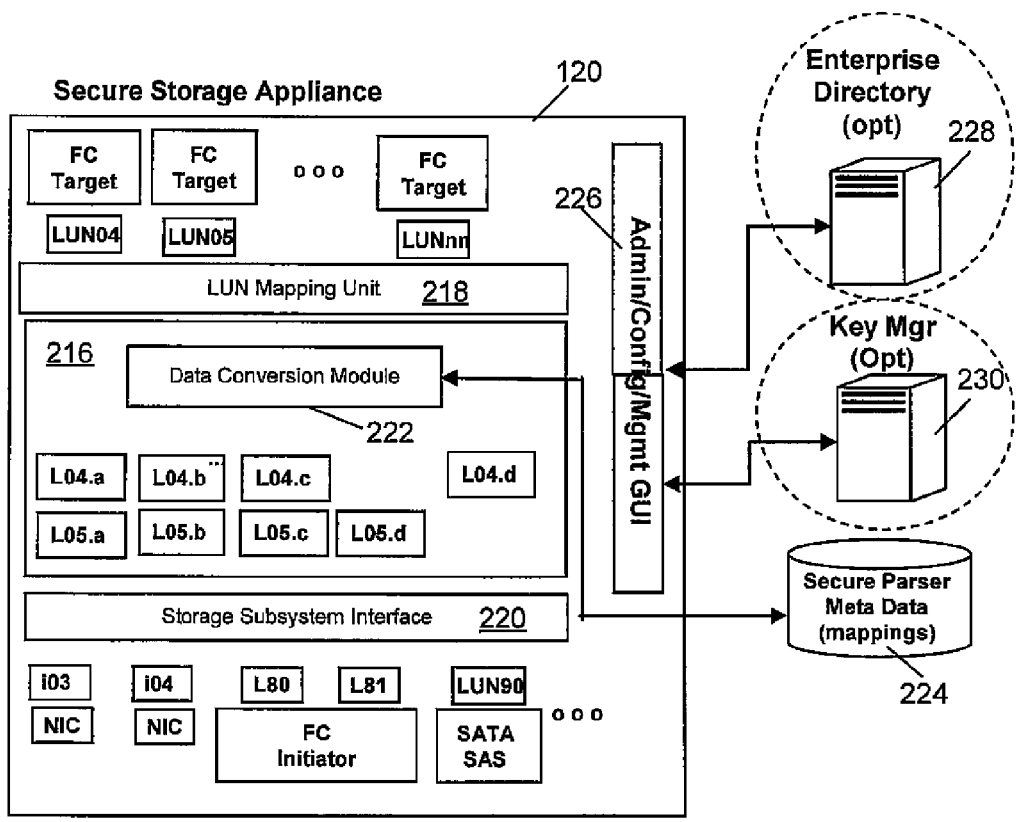
FIG. 5 illustrates a portion of a data storage system including a secure storage appliance, according to a possible embodiment of the present disclosure.

Referring now to FIG. 5, a portion of the data storage system 200 is shown, including details of the secure storage appliance 120. In the embodiment shown, the secure storage appliance 120 includes a number of functional modules that generally allow the secure storage appliance to map a number of physical disks to one or more separate, accessible volumes that can be made available to a client, and presenting a virtual disk to clients based on those defined volumes. Transparently to the user, the secure storage appliance applies a number of techniques to stored and retrieved data to provide data security.

In the embodiment shown, the secure storage appliance 120 includes a core functional unit 216, a LUN mapping unit 218, and a storage subsystem interface 220. The core functional unit 216 includes a data conversion module 222 that operates on data written to physical storage devices 206 and retrieved from the physical storage devices 206. In general, when the data conversion module 222 receives a logical unit of data (e.g. a file or directory) to be written to physical storage devices 206, it splits that primary data block at a physical level (i.e. a "block level") and encrypts the secondary data blocks using a number of encryption keys.

The manner of splitting the primary data block, and the number of physical blocks produced, is dictated by additional control logic within the core functional unit 216. As described in further detail below, during a write operation that writes a primary data block to physical storage (e.g. from an application server 202), the core functional unit 216 directs the data conversion module 222 to split the primary data block received from the application server 202 into N separate secondary data blocks. Each of the N secondary data blocks is intended to be written to a different physical storage device 206 within the data storage system 200. The core functional unit 216 also dictates to the data conversion module 222 the number of shares (for example, denoted as M of the N total shares) that are required to reconstitute the primary data block when requested by the application server 202.

The secure storage appliance 120 connects to a metadata store 224, which is configured to hold metadata information about the locations, redundancy, and encryption of the data stored on the physical storage devices 206. The metadata store 224 is generally held locally or in proximity to the secure storage appliance 120, to ensure fast access of metadata regarding the shares. The metadata store 224 can be, in various embodiments, a database or file system storage of data describing the data connections, locations, and shares used by the secure storage appliance. Additional details regarding the specific metadata stored in the metadata store 224 are described below.

The LUN mapping unit 218 generally provides a mapping of one or more physical storage devices 206 to a volume. Each volume corresponds to a specific collection of physical storage devices 206 upon which the data received from client devices is stored. In contrast, typical prior art systems assign a LUN (logical unit number) or other identifier to each physical storage device or connection port to such a device, such that data read operations and data write operations directed to a storage system 204 can be performed specific to a device associated with the system. In the embodiment shown, the LUNs correspond to target addressable locations on the secure storage appliance 120, of which one or more is exposed to a client device, such as an application server 202. Based on the mapping of LUNs to a volume, the virtual disk related to that volume appears as a directly-addressable component of the data storage system 200, having its own LUN. From the perspective of the application server 202, this obscures the fact that primary data blocks written to a volume can in fact be split, encrypted, and written to a plurality of physical storage devices across one or more storage systems 204.

The storage subsystem interface 220 routes data from the core functional unit 216 to the storage systems 204 communicatively connected to the secure storage appliance 120. The storage subsystem interface 220 allows addressing various types of storage systems 204. Other functionality can be included as well.

In the embodiment shown, a plurality of LUNs are made available by the LUN mapping unit 218, for addressing by client devices. As shown by way of example, LUNs LUN04-LUNnn are illustrated as being addressable by client devices. Within the core functional unit 216, the data conversion module 222 associates data written to each LUN with a share of that data, split into N shares and encrypted. In the embodiment shown in the example of FIG. 5, a block read operation or block write operation to LUN04 is illustrated as being associated with a four-way write, in which secondary data blocks L04.$a$ through L04.$d$ are created, and mapped to various devices connected to output ports, shown in FIG. 5 as network interface cards (NICs), a Fibre Channel interface, and a serial ATA interface. An analogous operation is also shown with respect to LUN05, but written to a different combination of shares and corresponding physical disks.

The core functional unit 216, LUN mapping unit 218, and storage subsystem interface 220 can include additional functionality as well, for managing timing and efficiency of data read and write operations. Additional details regarding this functionality are described in another embodiment, detailed below in conjunction with the secure storage appliance functionality described in FIG. 6.

The secure storage appliance 120 includes an administration interface 226 that allows an administrator to set up components of the secure storage appliance 120 and to otherwise manage data encryption, splitting, and redundancy. The administration interface 226 handles initialization and discovery on the secure storage appliance, as well as creation, modifying, and deletion of individual volumes and virtual disks; event handling; data base administration; and other system services (such as logging). Additional details regarding usage of the administration interface 226 are described below in conjunction with FIG. 14.

In the embodiment shown of the secure storage appliance 120, the secure storage appliance 120 connects to an optional enterprise directory 228 and a key manager 230 via the administration interface 226. The enterprise directory 228 is generally a central repository for information about the state of the secure storage appliance 120, and can be used to help coordinate use of multiple secure storage appliances in a network, as illustrated in the configuration shown in FIG. 10, below. The enterprise directory 228 can store, in various embodiments, information including a remote user table, a virtual disk table, a metadata table, a device table, log and audit files, administrator accounts, and other secure storage appliance status information.

In embodiments lacking the enterprise directory 228, redundant secure storage appliances 214 can manage and prevent failures by storing status information of other secure storage appliances, to ensure that each appliance is aware of the current state of the other appliances.

The key manager 230 stores and manages certain keys used by the data storage system 200 for encrypting data specific to various physical storage locations and various individuals and groups accessing those devices. In certain embodiments, the key manager 230 stores workgroup keys. Each workgroup key relates to a specific community of individuals (i.e. a "community of interest") and a specific volume, thereby defining a virtual disk for that community. The key manager 230 can also store local copies of session keys for access by the secure storage appliance 120. Secure storage appliance 120 uses each of the session keys to locally encrypt data on different ones of physical storage devices 206. Passwords can be stored at the key manager 230 as well. In certain embodiments, the key manager 230 is operable on a computing system configured to execute any of a number of key management software packages, such as the Key Management Service provided for a Windows Server environment, manufactured by Microsoft Corp. of Redmond, Wash.

Although the present disclosure provides for encryption keys including session keys and workgroup keys, additional keys may be used as well, such as a disk signature key, security group key, client key, or other types of keys. Each of these keys can be stored on one or more of physical storage devices 206, at the secure storage appliance 120, or in the key manager 230.

Although FIGS. 4-5 illustrate a particular arrangement of a data storage system 200 for secure storage of data, additional arrangements are possible as well that can operate consistently with the concepts of the present disclosure. For example, in certain embodiments, the system can include a different number or type of storage systems or physical storage devices, and can include one or more different types of client systems in place of or in addition to the application server 202. Furthermore, the secure storage appliance 120 can be placed in any of a number of different types of networks, but does not require the presence of multiple types of networks as illustrated in the example of FIG. 4.

Figure 6:
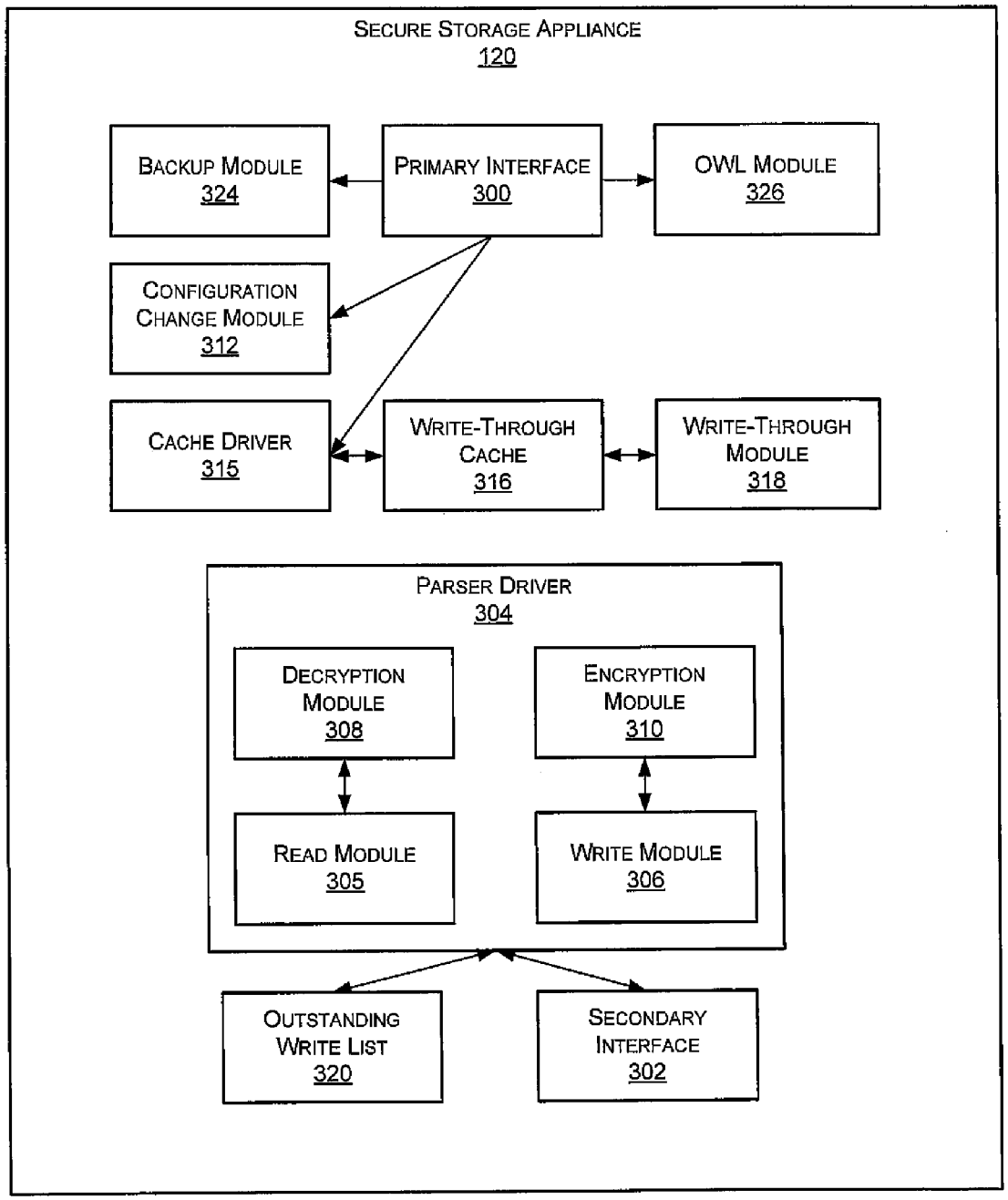
FIG. 6 illustrates a block diagram of logical components of a secure storage appliance, according to a possible embodiment of the present disclosure.

FIG. 6 is a block diagram that illustrates example logical components of the secure storage appliance 120. FIG. 6 represents only one example of the logical components of the secure storage appliance 120, for performing the operations described herein. The operations of the secure storage appliance 120 can be conceptualized and implemented in many different ways.

As illustrated in the example of FIG. 6, the secure storage appliance 120 comprises a primary interface 300 and a secondary interface 302. The primary interface 300 enables secure storage appliance 120 to receive primary I/O requests and to send primary I/O responses. For instance, the primary interface 300 can enable secure storage appliance 120 to receive primary I/O requests (e.g. read and write requests) from the application server device 202 and to send primary I/O responses to the application server 202. Secondary interface enables the secure storage appliance 120 to send secondary I/O requests to the storage systems 204, and to receive secondary I/O responses from those storage systems 204.

In addition, the secure storage appliance 120 comprises a parser driver 304. The parser driver 304 generally corresponds to the data conversion module 224 of FIG. 5, in that it processes primary I/O requests to generate secondary I/O requests and processes secondary I/O responses to generate primary I/O responses. To accomplish this, the parser driver 304 comprises a read module 305 that processes primary read requests to generate secondary read requests and processes secondary read responses to generate primary read responses. In addition, the parser driver 304 comprises a decryption module 308 that enables the read module 305 to reconstruct a primary data block using secondary blocks contained in secondary read responses. Example operations performed by the read module 305 are described below with reference to FIG. 18 and FIG. 21. Furthermore, the parser driver 304 comprises a write module 306 that processes primary write requests to generate secondary write requests and processes secondary write responses to generate primary write responses. The parser driver 304 also comprises an encryption module 310 that enables the write module 306 to cryptographically split primary data blocks in primary write requests into secondary data blocks to put in secondary write requests. An example operation performed by the write module 305 is described below as well with reference to FIGS. 19 and 23.

In the example of FIG. 6, the secure storage appliance 120 also comprises a cache driver 315. When enabled, the cache driver 315 receives primary I/O requests received by the primary interface 300 before the primary I/O requests are received by parser driver 304. When the cache driver 315 receives a primary read request to read data at a primary storage location of a virtual disk, the cache driver 315 determines whether a write-through cache 316 at the secure storage appliance 120 contains a primary write request to write a primary data block to the primary storage location of the virtual disk. If the cache driver 315 determines that the write-through cache 316 contains a primary write request to write a primary data block to the primary storage location of the virtual disk, the cache driver 315 outputs a primary read response that contains the primary data block. When the parser driver 304 receives a primary write request to write a primary data block to a primary storage location of a virtual disk, the cache driver 315 caches the primary write request in the write-through cache 316. A write-through module 318 performs write operations to memory from the write-through cache 316.

The secure storage appliance 120 also includes an outstanding write list (OWL) module 326. When enabled, the OWL module 326 receives primary I/O requests from the primary interface 300 before the primary I/O requests are received by the parser driver 304. The OWL module 326 uses an outstanding write list 320 to process the primary I/O requests.

In addition, the secure storage appliance 120 comprises a backup module 324. The backup module 324 performs an operation that backs up data at the storage systems 204 to backup devices, as described below in conjunction with FIGS. 17-18.

The secure storage appliance 120 also comprises a configuration change module 312. The configuration change module 312 performs an operation that creates or destroys a volume, and sets its redundancy configuration. Example redundancy configurations (i.e. "M of N" configurations) are described throughout the present disclosure, and refer to the number of shares formed from a block of data, and the number of those shares required to reconstitute the block of data. Further discussion is provided with respect to possible redundancy configurations below, in conjunction with FIGS. 8-9.

It should be appreciated that many alternate implementations of the secure storage appliance 120 are possible. For example, a first alternate implementation of the secure storage appliance 120 can include the OWL module 326, but not the cache driver 315, or vice versa. In other examples, the secure storage appliance 120 might not include the backup module 324 or the configuration change module 312. Furthermore, there can be many alternate operations performed by the various modules of the secure storage appliance 120.

Figure 7:
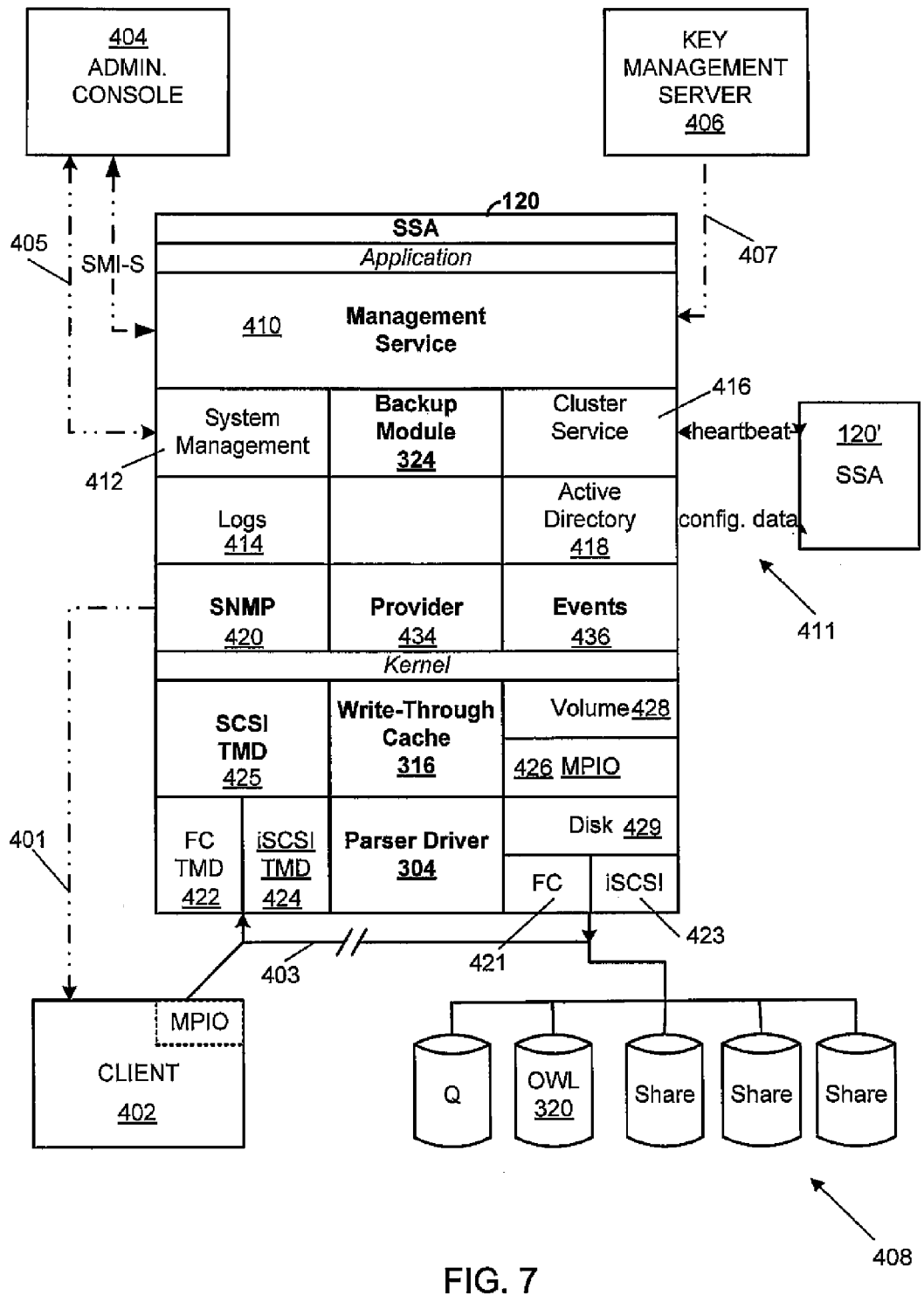
FIG. 7 illustrates a portion of a data storage system including a secure storage appliance, according to a further possible embodiment of the present disclosure.

FIG. 7 illustrates further details regarding connections to and operational hardware and software included in secure storage appliance 120, according to a possible embodiment of the present disclosure. The secure storage appliance 120 illustrates the various operational hardware modules available in the secure storage appliance to accomplish the data flow and software module operations described in FIGS. 4-6, above. In the embodiment shown, the secure storage appliance 120 is communicatively connected to a client device 402, an administrative console 404, a key management server 406, a plurality of storage devices 408, and an additional secure storage appliance 120'.

In the embodiment shown, the secure storage appliance 120 connects to the client device 402 via both an IP network connection 401 and a SAN network connection 403. The secure storage appliance 120 connects to the administrative console 404 by one or more IP connections 405 as well. The key management server 406 is also connected to the secure storage appliance 120 by an IP network connection 407. The storage devices 408 are connected to the secure storage appliance 120 by the SAN network 403, such as a Fibre Channel or other high-bandwidth data connection. Finally, in the embodiment shown, secure storage appliances 120, 120' are connected via any of a number of types of communicative connections 411, such as an IP or other connection, for communicating heartbeat messages and status information for coordinating actions of the secure storage appliance 120 and the secure storage appliance 120'. Although in the embodiment shown, these specific connections and systems are included, the arrangement of devices connected to the secure storage appliance 120, as well as the types and numbers of devices connected to the appliance may be different in other embodiments.

The secure storage appliance 120 includes a number of software-based components, including a management service 410 and a system management module 412. The management service 410 and the system management module 412 each connect to the administrative console 404 or otherwise provide system management functionality for the secure storage appliance 120. The management service 410 and system management module 412 are generally used to set various settings in the secure storage appliance 120, view logs 414 stored on the appliance, and configure other aspects of a network including the secure storage appliance 120. Additionally, the management service 410 connects to the key management server 406, and can request and receive keys from the key management server 406 as needed.

A cluster service 416 provides synchronization of state information between the secure storage appliance 120 and secure storage appliance 120'. In certain embodiments, the cluster service 416 manages a heartbeat message and status information exchanged between the secure storage appliance 120 and the secure storage appliance 120'. Secure storage appliance 120 and secure storage appliance 120' periodically exchange heartbeat messages to ensure that secure storage appliance 120 and secure storage appliance 120' maintain contact. Secure storage appliance 120 and secure storage appliance 120' maintain contact to ensure that the state information received by each secure storage appliance indicating the state of the other secure storage appliance is up to date. An active directory services 418 stores the status information, and provides status information periodically to other secure storage appliances via the connection 412.

Additional hardware and/or software components provide datapath functionality to the secure storage appliance 120 to allow receipt of data and storage of data at the storage systems 408. In the embodiment shown, the secure storage appliance 120 includes a SNMP connection module 420 that enables secure storage appliance 120 to communicate with client devices via the IP network connection 401, as well as one or more high-bandwidth data connection modules, such as a Fibre Channel input module 422 or SCSI input module 424 for receiving data from the client 402 or storage systems 408. Analogous data output modules including a Fibre Channel connection module 421 or SCSI connection module 423 can connect to the storage systems 408 or client 402 via the SAN network 403 for output of data.

Additional functional systems within the secure storage appliance 120 assist in datapath operations. A SCSI command module 425 parses and forms commands to be sent out or received from the client device 402 and storage systems 408. A multipath communications module 426 provides a generalized communications interface for the secure storage appliance 120, and a disk volume 428, disk 429, and cache 430 provide local data storage for the secure storage appliance 120.

Additional functional components can be included in the secure storage appliance 120 as well. In the embodiment shown, a parser driver 304 provides data splitting and encryption capabilities for the secure storage appliance 120, as previously explained. A provider 434 includes volume management information, for creation and destruction of volumes. An events module 436 generates and handles events based on observed occurrences at the secure storage appliance (e.g. data errors or communications errors with other systems).

Figures 8, 9:
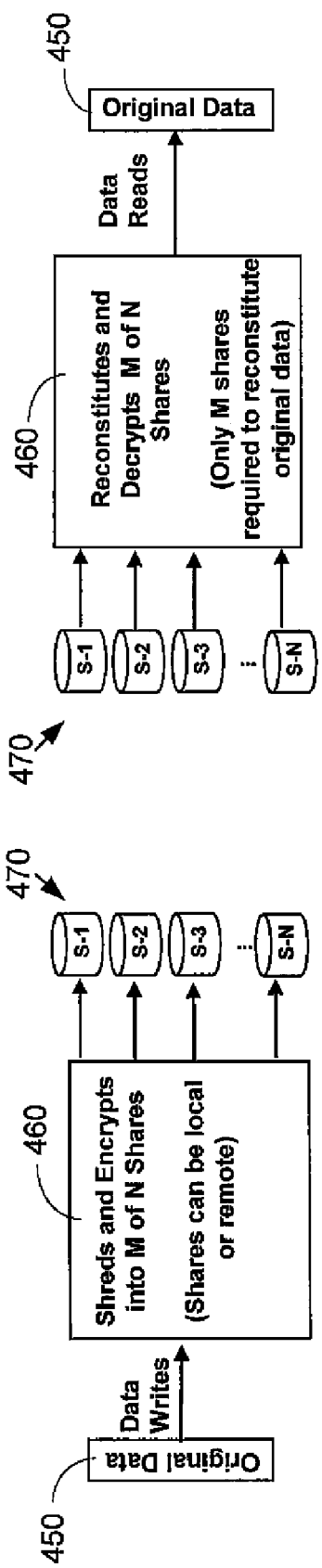
FIG. 8 illustrates dataflow of a write operation according to a possible embodiment of the present disclosure.
FIG. 9 illustrates dataflow of a read operation according to a possible embodiment of the present disclosure.

FIGS. 8-9 provide a top level sense of a dataflow occurring during write and read operations, respectively, passing through a secure storage appliance, such as the secure storage appliance described above in conjunction with FIGS. 3-7. FIG. 8 illustrates a dataflow of a write operation according to a possible embodiment of the present disclosure, while FIG. 9 illustrates dataflow of a read operation. In the write operation of FIG. 8, a primary data block 450 is transmitted to a secure storage appliance (e.g. from a client device such as an application server). The secure storage appliance can include a functional block 460 to separate the primary data block into N secondary data blocks 470, shown as S-1 through S-N. In certain embodiments, the functional block 460 is included in a parser driver, such as parser driver 304, above. The specific number of secondary data blocks can vary in different networks, and can be defined by an administrative user having access to control settings relevant to the secure storage appliance. Each of the secondary data blocks 470 can be written to separate physical storage devices. In the read operation of FIG. 9, M secondary data blocks are accessed from physical storage devices, and provided to the functional block 460 (e.g. parser driver 304). The functional block 460 then performs an operation inverse to that illustrated in FIG. 8, thereby reconstituting the primary data block 450. The primary data block can then be provided to the requesting device (e.g. a client device).

In each of FIGS. 8-9, the N secondary data blocks 470 each represent a cryptographically split portion of the primary data block 450, such that the functionality 460 requires only M of the N secondary data blocks (where M<=N) to reconstitute the primary data block 450. The cryptographic splitting and data reconstitution of FIGS. 8-9 can be performed according to any of a number of techniques. In one embodiment the parser driver 304 executes SecureParser software provided by Security First Corporation of Rancho Santa Margarita, Calif.

Although, in the embodiment shown in FIG. 9, the parser driver 304 uses the N secondary data blocks 470 to reconstitute the primary data block 450, it is understood that in certain applications, fewer than all of the N secondary data blocks 470 are required. For example, when the parser driver 304 generates N secondary data blocks during a write operation such that only M secondary data blocks are required to reconstitute the primary data block (where M<N), then data conversion module 60 only needs to read that subset of secondary data block from physical storage devices to reconstitute the primary data block 450.

For example, during operation of the parser driver 304 a data conversion routine may generate four secondary data blocks 470, of which two are needed to reconstitute a primary data block (i.e. M=2, N=4). In such an instance, two of the secondary data blocks 470 may be stored locally, and two of the secondary data blocks 470 may be stored remotely to ensure that, upon failure of a device or catastrophic event at one location, the primary data block 450 can be recovered by accessing one or both of the secondary data blocks 470 stored remotely. Other arrangements are possible as well, such as one in which four secondary data blocks 470 are stored locally and all are required to reconstitute the primary data block 450 (i.e. M=4, N=4). At its simplest, a single share could be created (M=N=1).

In certain embodiments, the parser driver whose operation is described in FIGS. 8-9 can operate on other data as well. For example, the parser driver 304 can be used to split and encrypt (or conversely decrypt and reconstitute) one or more session keys that are used to secure data on the various shares. In such embodiments, operation is analogous to that described above.

Figure 10:
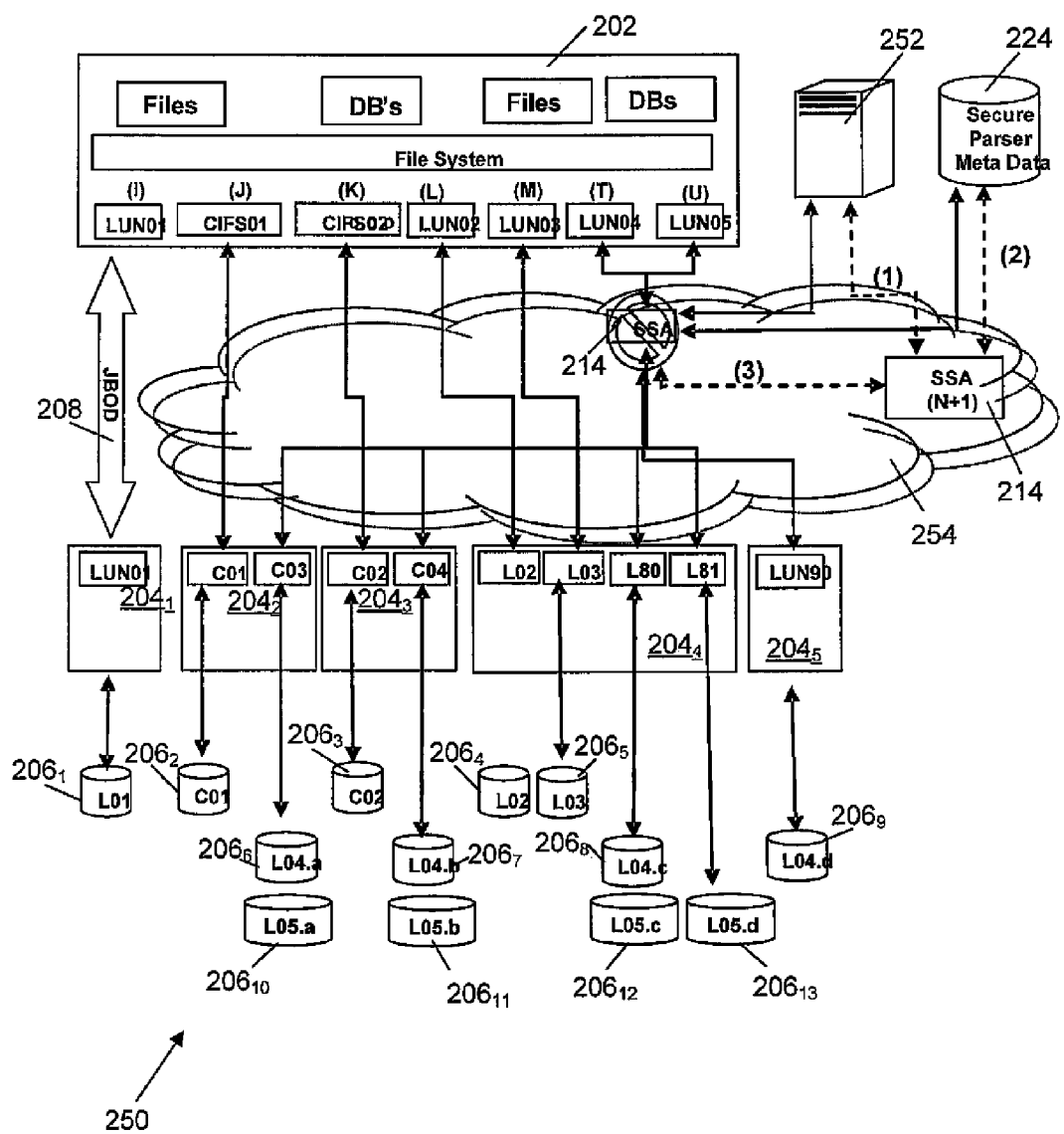
FIG. 10 illustrates a further possible embodiment of a data storage network including redundant secure storage appliances, according to a possible embodiment of the present disclosure.

FIG. 10 illustrates a further possible embodiment of a data storage system 250, according to a possible embodiment of the present disclosure. The data storage system 250 generally corresponds to the data storage system 200 of FIG. 4, above, but further includes redundant secure storage appliances 214. Each of secure storage appliances 214 may be an instance of secure storage appliance 120. Inclusion of redundant secure storage appliances 214 allows for load balancing of read and write requests in the data storage system 250, such that a single secure storage appliance is not required to process every secure primary read command or primary write command passed from the application server 202 to one of the secure storage appliance 214. Use of redundant secure storage appliances also allows for failsafe operation of the data storage system 250, by ensuring that requests made of a failed secure storage appliance are rerouted to alternative secure storage appliances.

In the embodiment of the data storage system 250 shown, two secure storage appliances 214 are shown. Each of the secure storage appliances 214 can be connected to any of a number of clients (e.g. the application server 202), as well as secured storage systems 204, the metadata store 224, and a remote server 252. In various embodiments, the remote server 252 could be, for example, an enterprise directory 228 and/or a key manager 230.

The secure storage appliances 214 are also typically connected to each other via a network connection. In the embodiment shown in the example of FIG. 10, the secure storage appliances 214 reside within a network 254. In various embodiments, network 254 can be, for example, an IP-based network, SAN as previously described in conjunction with FIGS. 4-5, or another type of network. In certain embodiments, the network 254 can include aspects of one or both types of networks. An example of a particular configuration of such a network is described below in conjunction with FIGS. 11-12.

The secure storage appliances 214 in the data storage system 250 are connected to each other across a TCP/IP portion of the network 254. This allows for the sharing of configuration data, and the monitoring of state, between the secure storage appliances 214. In certain embodiments there can be two IP-based networks, one for sharing of heartbeat information for resiliency, and a second for configuration and administrative use. The secure storage appliance 120 can also potentially be able to access the storage systems 204, including remote storage systems, across an IP network using a data interface.

In operation, sharing of configuration data, state data, and heartbeat information between the secure storage appliances 214 allows the secure storage appliances 214 to monitor and determine whether other secure storage appliances are present within the data storage system 250. Each of the secure storage appliances 214 can be assigned specific addresses of read operations and write operations to process. Secure storage appliances 214 can reroute received I/O commands to the appropriate one of the secure storage appliances 214 assigned that operation based upon the availability of that secure storage appliance and the resources available to the appliance. Furthermore, the secure storage appliances 214 can avoid addressing a common storage device 204 or application server 202 port at the same time, thereby avoiding conflicts. The secure storage appliances 214 also avoid reading from and writing to the same share concurrently to prevent the possibility of reading stale data.

When one of the secure storage appliances 214 fails, a second secure storage appliance can determine the state of the failed secure storage appliance based upon tracked configuration data (e.g. data tracked locally or stored at the remote server 252). The remaining operational one of the secure storage appliance 214 can also access information in the metadata store 224, including share and key information defining volumes, virtual disks and client access rights, to either process or reroute requests assigned to the failed device.

As previously described, the data storage system 250 is intended to be exemplary of a possible network in which aspects of the present disclosure can be implemented; other arrangements are possible as well, using different types of networks, systems, storage devices, and other components.

Figure 11:
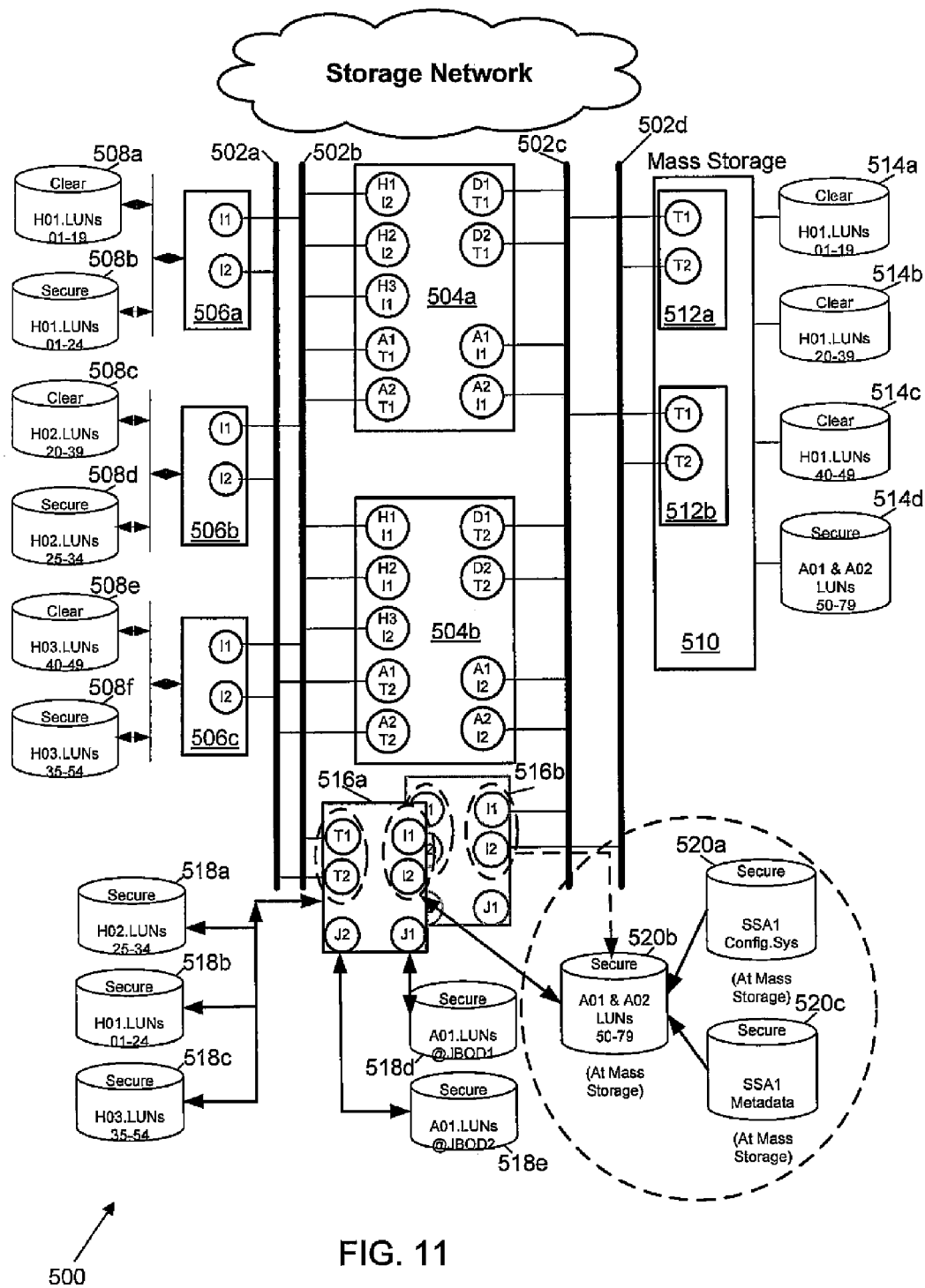
FIG. 11 illustrates incorporation of secure storage appliances in a portion of a data storage network, according to a possible embodiment of the present disclosure.

Referring now to FIG. 11, one possibility of a methodology of incorporating secure storage appliances into a data storage network, such as a SAN, is shown according to a possible embodiment of the present disclosure. In the embodiment shown, a secure storage network 500 provides for fully redundant storage, in that each of the storage systems connected at a client side of the network is replicated in mass storage, and each component of the network (switches, secure storage appliances) is located in a redundant array of systems, thereby providing a failsafe in case of component failure. In alternative embodiments, the secure storage network 500 can be simplified by including only a single switch and/or single secure storage appliance, thereby reducing the cost and complexity of the network (while coincidentally reducing the protection from component failure).

In the embodiment shown, an overall secure storage network 500 includes a plurality of data lines 502*a-d* interconnected by switches 504*a-b*. Data lines 502*a-b* connect to storage systems 506*a-c*, which connect to physical storage disks 508*a-f*. The storage systems 506*a-c* correspond generally to smaller-scale storage servers, such as an application server, client device, or other system as previously described. In the embodiment shown in the example of FIG. 11, storage system 506*a* connects to physical storage disks 508*a-b*, storage system 506*b* connects to physical storage disks 508*c-d*, and storage system 506*c* connects to physical storage disks 508*e-f*. The secure storage network 500 can be implemented in a number of different ways, such as through use of Fibre Channel or iSCSI communications as the data lines 502*a-d*, ports, and other data communications channels. Other high bandwidth communicative connections can be used as well.

The switches 504*a-b* connect to a large-scale storage system, such as the mass storage 510 via the data lines 502*c-d*. The mass storage 510 includes, in the embodiment shown, two data directors 512*a-b*, which respectively direct data storage and requests for data to one or more of the back end physical storage devices 514*a-d*. In the embodiment shown, the physical storage devices 514*a-c* are unsecured (i.e. not cryptographically split and encrypted), while the physical storage device 514*d* stores secure data (i.e. password secured or other arrangement).

The secure storage appliances 516*a-b* also connect to the data lines 502*a-d*, and each connect to the secure physical storage devices 518*a-e*. Additionally, the secure storage appliances 516*a-b* connect to the physical storage devices 520*a-c*, which can reside at a remote storage location (e.g. the location of the large-scale storage system 510).

In certain embodiments providing redundant storage locations, the network 500 allows a user to configure the secure storage appliances 516a-b such that, using the M of N cryptographic splitting enabled in each of the secure storage devices 516a-b, M shares of data can be stored on physical storage devices at a local location to provide fast retrieval of data, while another M shares of data can be stored on remote physical storage devices at a remote location. Therefore, failure of one or more physical disks or secure storage devices does not render data unrecoverable, because a sufficient number of shares of data remain accessible to at least one secure storage device capable of reconstituting requested data.

Figure 12:
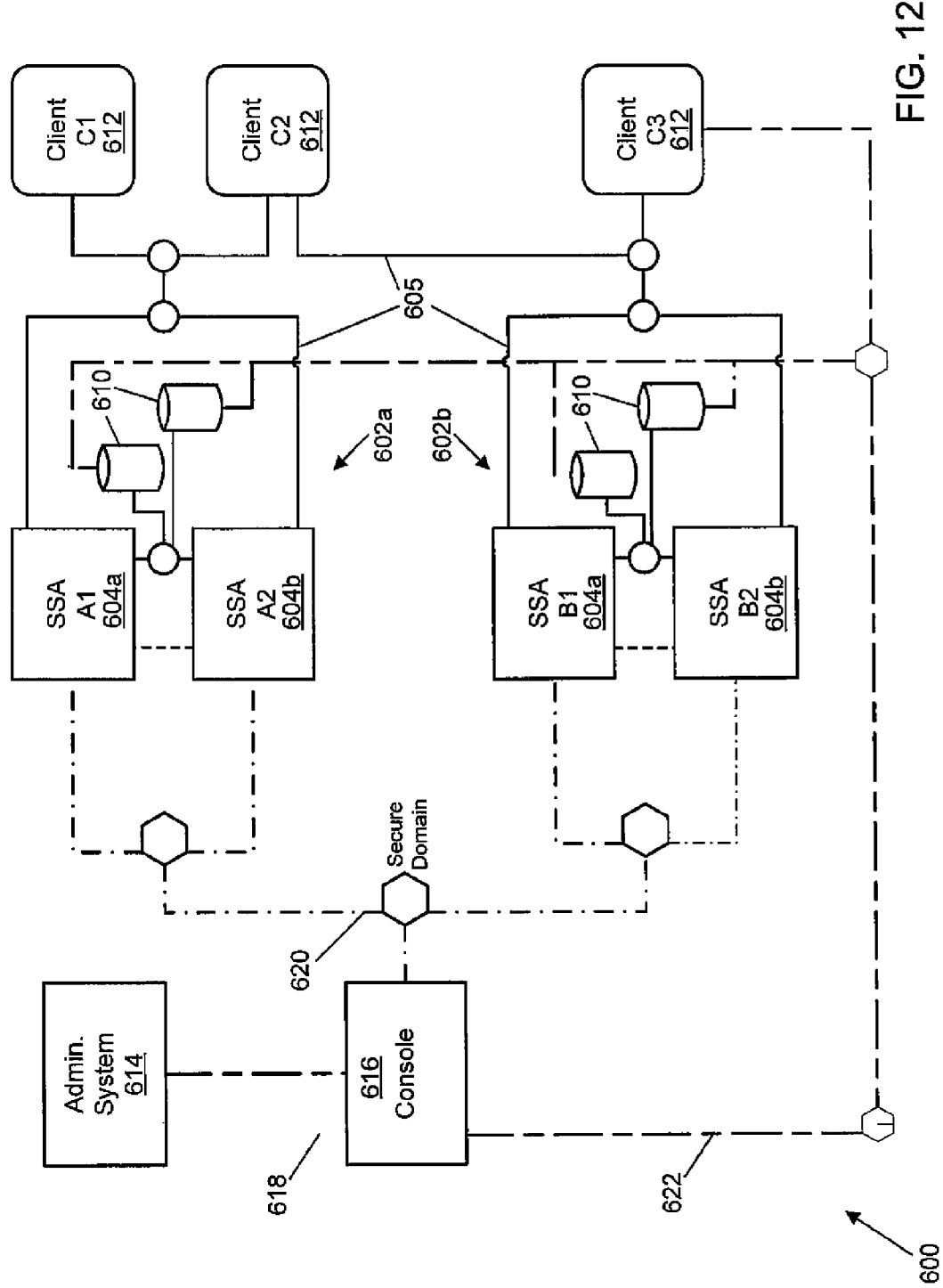
FIG. 12 illustrates an arrangement of a data storage network according to a possible embodiment of the present disclosure.

FIG. 12 illustrates a particular cluster-based arrangement of a data storage network 600 according to a possible embodiment of the present disclosure. The data storage network 600 is generally arranged such that clustered secure storage appliances access and store shares on clustered physical storage devices, thereby ensuring fast local storage and access to the cryptographically split data. The data storage network 600 is therefore a particular arrangement of the networks and systems described above in FIGS. 1-11, in that it represents an arrangement in which physical proximity of devices is accounted for.

In the embodiment shown, the data storage network 600 includes two clusters, 602a-b. Each of the clusters 602a-b includes a pair of secure storage appliances 604a-b, respectively. In the embodiment shown, the clusters 602a-b are labeled as clusters A and B, respectively, with each cluster including two secure storage appliances 604a-b (shown as appliances A1 and A2 in cluster 602a, and appliances B1 and B2 in cluster 602b, respectively). The secure storage appliances 604a-b within each of the clusters 602a-b are connected via a data network 605 (e.g. via switches or other data connections in an iSCSI, Fibre Channel, or other data network, as described above and indicated via the nodes and connecting lines shown within the network 605) to a plurality of physical storage devices 610. Additionally, the secure storage appliances 604a-b are connected to client devices 612, shown as client devices C1-C3, via the data storage network 605. The client devices 612 can be any of a number of types of devices, such as application servers, database servers, or other types of data-storing and managing client devices.

In the embodiment shown, the client devices 612 are connected to the secure storage appliances 604a-b such that each of client devices 612 can send I/O operations (e.g. a read request or a write request) to two or more of the secure storage appliances 604a-b, to ensure a backup datapath in case of a connection failure to one of secure storage appliances 604a-b. Likewise, the secure storage appliances 604a-b of each of clusters 602a-b are both connected to a common set of physical storage devices 610. Although not shown in the example of FIG. 12, the physical storage devices 610 can be, in certain embodiments, managed by separate storage systems, as described above. Such storage systems are removed from the illustration of the network 600 for simplicity, but can be present in practice.

An administrative system 614 connects to a maintenance console 616 via a local area network 618. Maintenance console 616 has access to a secured domain 620 of an IP-based network 622. The maintenance console 616 uses the secured domain 620 to access and configure the secure storage appliances 604a-b. One method of configuring the secure storage appliances is described below in conjunction with FIG. 14.

The maintenance console 616 is also connected to both the client devices 612 and the physical storage devices 610 via the IP-based network 622. The maintenance console 616 can determine the status of each of these devices to determine whether connectivity issues exist, or whether the device itself has become non-responsive.

Figure 13:
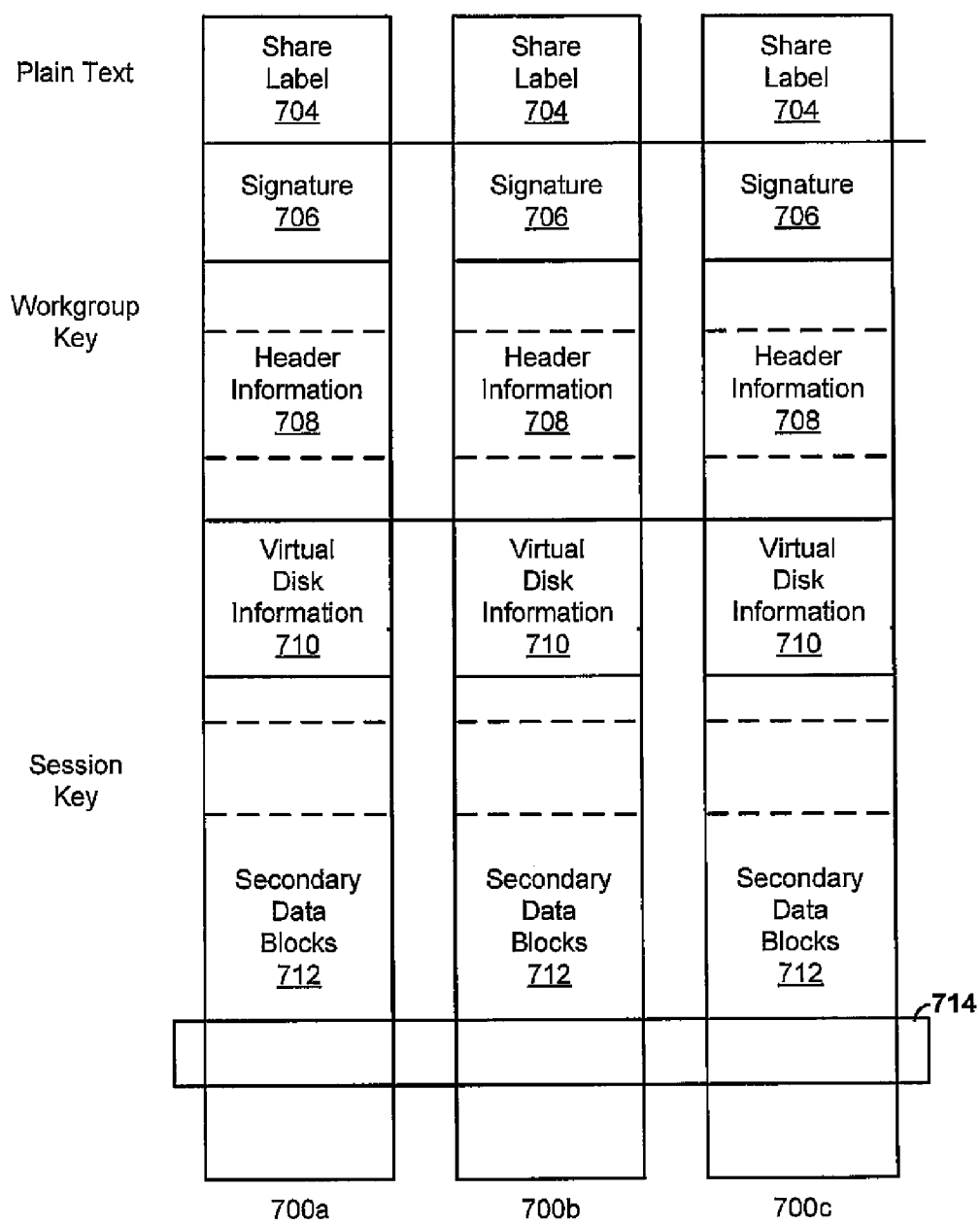
FIG. 13 illustrates a physical block structure of data to be written onto a physical storage device, according to aspects of the present disclosure.

Referring now to FIG. 13, an example physical block structure of data written onto one or more physical storage devices is shown, according to aspects of the present disclosure. The example of FIG. 13 illustrates three strips 700A, 700B, and 700C (collectively, "shares 700"). Each of strips 700 is a share of a physical storage device devoted to storing data associated with a common volume. For example, in a system in which a write operation splits a primary data block into three secondary data blocks (i.e. N=3), the shares 700 would be appropriately used to store each of the secondary data blocks. As used in this disclosure, a volume is grouped storage that is presented by a secure storage appliance to clients of secure storage appliance (e.g. secure storage appliance 120 or 214 as previously described), such that the storage appears as a contiguous, unitary storage location. Secondary data blocks of a volume are distributed among strips 700. In systems implementing a different number of shares (e.g. N=2, 4, 6, etc.), a different, corresponding number of shares would be used. As basic as a 1 of 1 configuration (M=1, N=1) configuration could be used.

Each of the strips 700 corresponds to a reserved portion of memory of a different one of physical storage devices (e.g. physical storage devices 206 previously described), and relates to a particular I/O operation from storage or reading of data to/from the physical storage device. Typically, each of the strips 700 resides on a different one of physical storage devices. Furthermore, although three different strips are shown in the illustrative embodiment shown, more or fewer strips can be used as well. In certain embodiments, each of the strips 700 begins on a sector boundary. In other arrangements, the each of the strips 700 can begin at any other memory location convenient for management within the share.

Each of strips 700 includes a share label 704, a signature 706, header information 708, virtual disk information 710, and data blocks 712. The share label 704 is written on each of strips 700 in plain text, and identifies the volume and individual share. The share labels 704 can also, in certain embodiments, contain information describing other header information for the strips 700, as well as the origin of the data written to the strip (e.g. the originating cluster).

The signatures 706 contain information required to construct the volume, and is encrypted by a workgroup key. The signatures 706 contain information that can be used to identify the physical device upon which data (i.e. the share) is stored. The workgroup key corresponds to a key associated with a group of one or more users having a common set of usage rights with respect to data (i.e. all users within the group can have access to common data.) In various embodiments, the workgroup key can be assigned to a corporate department using common data, a common group of one or more users, or some other community of interest for whom common access rights are desired.

The header information 708 contains session keys used to encrypt and decrypt the volume information included in the virtual disk information 710, described below. The header information 708 is also encrypted by the workgroup key. In certain embodiments, the header information 708 includes headers per section of data. For example, the header information 708 may include one header for each 64 GB of data. In such embodiments, it may be advantageous to include at least one empty header location to allow re-keying of the data encrypted with a preexisting session key, using a new session key. Example methods of re-keying are described below in conjunction with FIGS. 22-23.

The virtual disk information 710 includes metadata that describes a virtual disk, as it is presented by a secure storage appliance. The virtual disk information 710, in certain embodiments, includes names to present the virtual disk, a volume security descriptor, and security group information. The virtual disk information 710 can be, in certain embodiments, encrypted by a session key associated with the physical storage device upon which the strips 700 are stored, respectively.

The secondary data blocks 712 correspond to a series of memory locations used to contain the cryptographically split and encrypted data. Each of the secondary data blocks 712 contains data created at a secure storage appliance, followed by metadata created by the secure storage appliance as well. The N secondary data blocks created from a primary data block are combined to form a stripe 714 of data. The metadata stored alongside each of the secondary data blocks 712 contains an indicator of the header used for encrypting the data. In one example implementation, each of the secondary data blocks 712 includes metadata that specifies a number of times that the secondary data block has been written. A volume identifier and stripe location of an primary data block an be stored as well.

It is noted that, although a session key is associated with a volume, multiple session keys can be used per volume. For example, a volume may include one session key per 64 GB block of data. In this example, each 64 GB block of data contains an identifier of the session key to use in decrypting that 64 GB block of data. The session keys used to encrypt data in each strip 700 can be of any of a number of forms. In certain embodiments, the session keys use an AES-256 Counter with Bit Splitting. In other embodiments, it may be possible to perform bit splitting without encryption. Therefore, alongside each secondary data block 712, an indicator of the session key used to encrypt the data block may be provided.

A variety of access request prioritization algorithms can be included for use with the volume, to allow access of only quickest-responding physical storage devices associated with the volume. Status information can be stored in association with a volume and/or share as well, with changes in status logged based on detection of event occurrences. The status log can be located in a reserved, dedication portion of memory of a volume. Other arrangements are possible as well.

It is noted that, based on the encryption of session keys with workgroup keys and the encryption of the secondary data blocks 712 in each strip 700 with session keys, it is possible to effectively delete all of the data on a disk or volume (i.e. render the data useless) by deleting all workgroup keys that could decrypt a session key for that disk or volume. Therefore, alongside each secondary data block 712, an indicator of the session key used to encrypt the data block may be provided.

In certain embodiments, each of the session keys can be, instead of encrypted as whole entities using a workgroup key and stored in a header of the shares 700, cryptographically split and encrypted with the workgroup key as well. In such embodiments, the session keys can be split such that fewer than all portions of a split, encrypted session key may be required to reconstitute a session key, in a manner analogous to that of the data blocks described herein.

Figure 14:
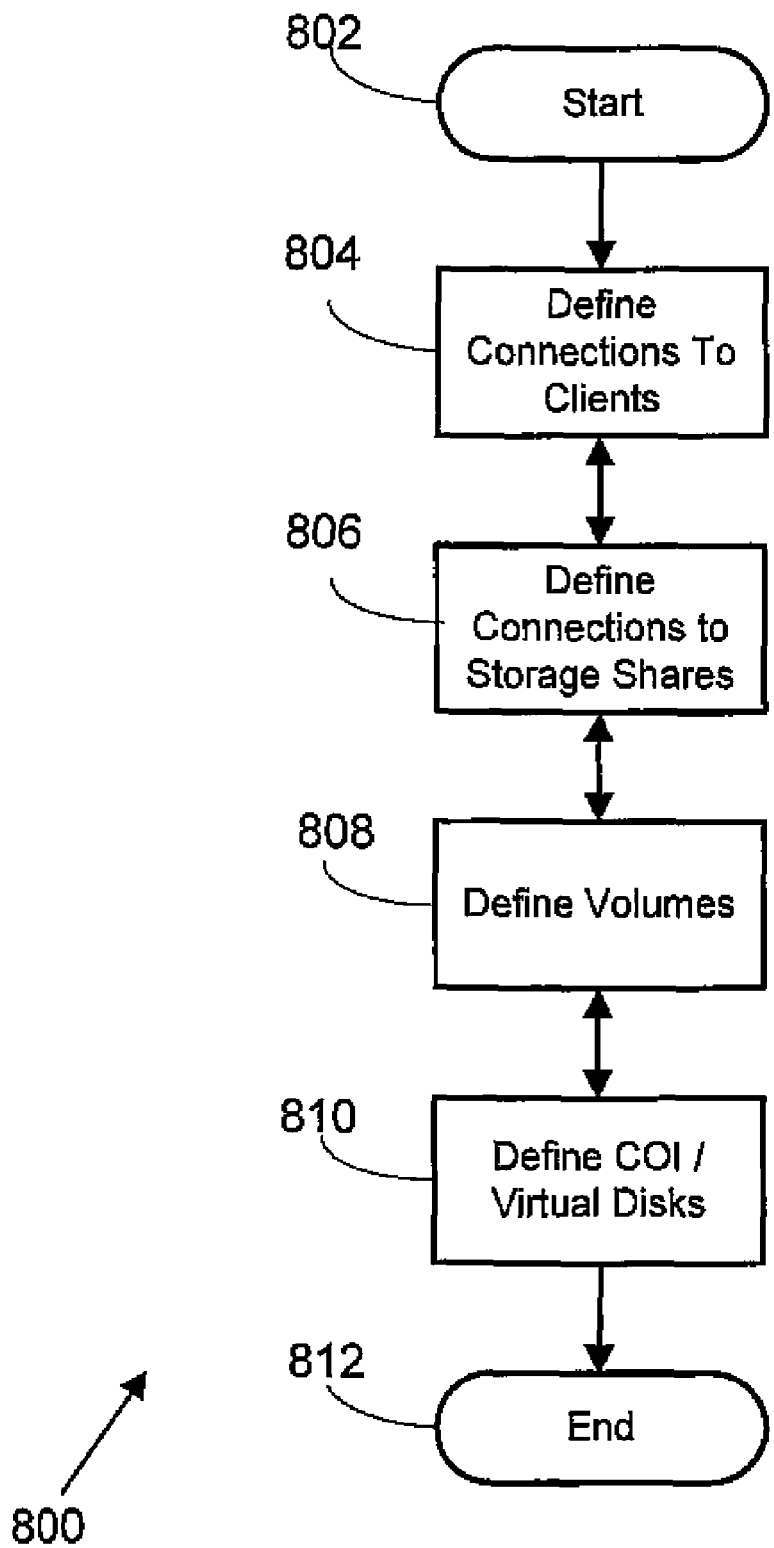
FIG. 14 shows a flowchart of systems and methods for providing access to secure storage in a storage area network according to a possible embodiment of the present disclosure.
Figure 15:
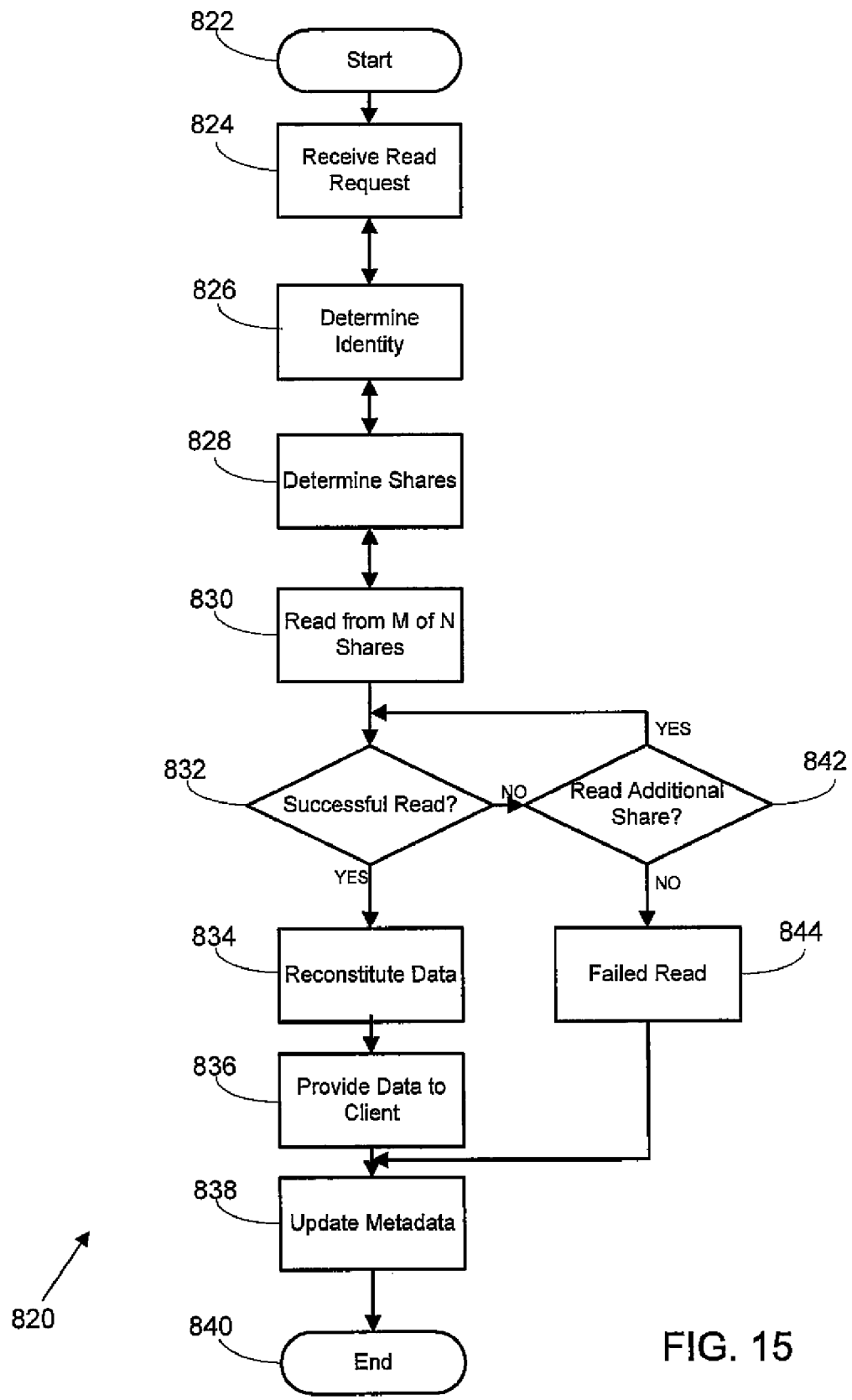
FIG. 15 shows a flowchart of systems and methods for reading block-level secured data according to a possible embodiment of the present disclosure.
Figure 16:
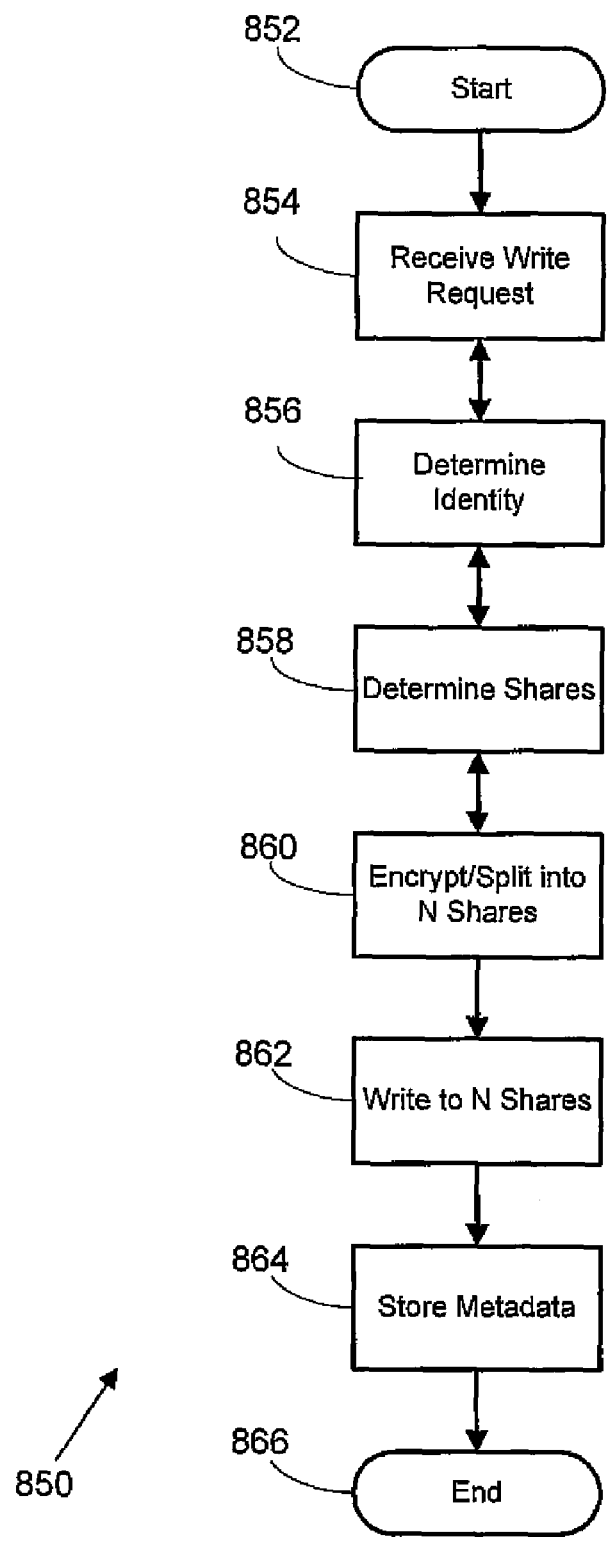
FIG. 16 shows a flowchart of systems and methods for writing block-level secured data according to a possible embodiment of the present disclosure.

Referring now to FIGS. 14-16, basic example flowcharts of setup and use of the networks and systems disclosed herein are described. Although these flowcharts are intended as example methods for administrative and I/O operations, such operations can include additional steps/modules, can be performed in a different order, and can be associated with different number and operation of modules. In certain embodiments, the various modules can be executed concurrently.

FIG. 14 shows a flowchart of systems and methods 800 for providing access to secure storage in a storage area network according to a possible embodiment of the present disclosure. The methods and systems 800 correspond to a setup arrangement for a network including a secure data storage system such as those described herein, including one or more secure storage appliances. The embodiments of the methods and systems described herein can be performed by an administrative user or administrative software associated with a secure storage appliance, as described herein.

Operational flow is instantiated at a start operation 802, which corresponds to initial introduction of a secure storage appliance into a network by an administrator or other individuals of such a network in a SAN, NAS, or other type of networked data storage environment Operational flow proceeds to a client definition module 804 that defines connections to client devices (i.e. application servers or other front-end servers, clients, or other devices) from the secure storage appliance. For example, the client definition module 804 can correspond to mapping connections in a SAN or other network between a client such as application server 202 and a secure storage appliance 120 of FIG. 4.

Operational flow proceeds to a storage definition module 806. The storage definition module 806 allows an administrator to define connections to storage systems and related physical storage devices. For example, the storage definition module 806 can correspond to discovering ports and routes to storage devices 204 within the system 200 of FIG. 4, above.

Operational flow proceeds to a volume definition module 808. The volume definition module 808 defines available volumes by grouping physical storage into logical arrangements for storage of shares of data. For example, an administrator can create a volume, and assign a number of attributes to that volume. A storage volume consists of multiple shares or segments of storage from the same or different locations. The administrator can determine a number of shares into which data is cryptographically split, and the number of shares required to reconstitute that data. The administrator can then assign specific physical storage devices to the volume, such that each of the N shares is stored on particular devices. The volume definition module 808 can generate session keys for storing data on each of the physical storage devices, and store that information in a key server and/or on the physical storage devices. In certain embodiments, the session keys generated in the volume definition module 808 are stored both on a key server connected to the secure storage appliance and on the associated physical storage device (e.g. after being encrypted with an appropriate workgroup key generated by the communities of interest module 810, below). Optionally, the volume definition module 808 includes a capability of configuring preferences for which shares are first accessed upon receipt of a request to read data from those shares.

Operational flow proceeds to a communities of interest module 810. The communities of interest module 810 corresponds to creation of one or more groups of individuals having interest in data to be stored on a particular volume. The communities of interest 810 module further corresponds to assigning of access rights and visibility to volumes to one or more of those groups.

In creating the groups via the communities of interest module 810, one or more workgroup keys may be created, with each community of interest being associated with one or more workgroup keys. The workgroup keys are used to encrypt access information (e.g. the session keys stored on volumes created during operation of the volume definition module 810) related to shares, to ensure that only individuals and devices from within the community of interest can view and access data associated with that group. Once the community of interest is created and associated with a volume, client devices identified as part of the community of interest can be provided with a virtual disk, which is presented to the client device as if it is a single, unitary volume upon which files can be stored.

In use, the virtual disks appear as physical disks to the client and support SCSI or other data storage commands. Bach virtual disk is associated on a many-to-one basis with a volume, thereby allowing multiple communities of interest to view common data on a volume (e.g. by replicating the relevant session keys and encrypting those keys with relevant workgroup keys of the various communities of interest). A write command will cause the data to be encrypted and split among multiple shares of the volume before writing, while a read command will cause the data to be retrieved from the shares, combined, and decrypted.

Operational flow terminates at end operation 812, which corresponds to completion of the basic required setup tasks to allow usage of a secure data storage system.

FIG. 15 shows a flowchart of systems and methods 820 for reading block-level secured data according to a possible embodiment of the present disclosure. The methods and systems 820 correspond to a read or input command related to data stored via a secure storage appliance, such as those described herein. Operational flow in the system 820 begins at a start operation 822. Operational flow proceeds to a receive read request module 824, which corresponds to receipt of a primary read request at a secure storage appliance from a client device (e.g. an application server or other client device, as illustrated in FIGS. 3-4). The read request generally includes an identifier of a virtual disk from which data is to be read, as well as an identifier of the requested data.

Operational flow proceeds to an identity determination module 826, which corresponds to a determination of the identity of the client from which the read request is received. The client's identity generally corresponds with a specific community of interest. This assumes that the client's identity for which the secure storage appliance will access a workgroup key associated with the virtual disk that is associated with the client.

Operational flow proceeds to a share determination module 828. The share determination module 828 determines which shares correspond with a volume that is accessed by way of the virtual disk presented to the user and with which the read request is associated. The shares correspond to at least a minimum number of shares needed to reconstitute the primary data block (i.e. at least M of the N shares). In operation, a read module 830 issues secondary read requests to the M shares, and receives in return the secondary data blocks stored on the associated physical storage devices.

A success operation 832 determines whether the read module 830 successfully read the secondary data blocks. The success operation may detect for example, that data has been corrupted, or that a physical storage device holding one of the M requested shares has failed, or other errors. If the read is successful, operational flow branches "yes" to a reconstitute data module 834. The reconstitute data module 834 decrypts a session key associated with each share with the workgroup key accessed by the identity determination module 826. The reconstitute data module 834 provides the session key and the encrypted and cryptographically split data to a data processing system within the secure storage appliance, which reconstitutes the requested data in the form of an unencrypted block of data physical disk locations in accordance with the principles described above in FIGS. 8-9 and 13. A provide data module 836 sends the reconstituted block of data to the requesting client device. A metadata update module 838 updates metadata associated with the shares, including, for example, access information related to the shares. From the metadata update module 838, operational flow proceeds to an end operation 840, signifying completion of the read request.

If the success operation 832 determines that not all of the M shares are successfully read, operational flow proceeds to a supplemental read operation 842, which determines whether an additional share exists from which to read data. If such a share exists (e.g. M<N), then the supplemental read operation reads that data, and operational flow returns to the success operation 832 to determine whether the system has now successfully read at least M shares and can reconstitute the primary data block as requested. If the supplemental read operation 842 determines that no further blocks of data are available to be read (e.g. M=N or M+failed reads>N), operational flow proceeds to a fail module 844, which returns a failed read response to the requesting client device. Operational flow proceeds to the update metadata module 838 and end operation 840, respectively, signifying completion of the read request.

Optionally, the fail module 844 can correspond to a failover event in which a backup copy of the data (e.g. a second N shares of data stored remotely from the first N shares) are accessed. In such an instance, once those shares are tested and failed, a fail message is sent to a client device.

In certain embodiments, commands and data blocks transmitted to the client is device can be protected or encrypted, such as by using a public/private key or symmetric key encryption techniques, or by isolating the data channel between the secure storage appliance and client. Other possibilities exist for protecting data passing between the client and secure storage appliance as well.

Furthermore, although the system 820 of FIG. 15 illustrates a basic read operation, it is understood that certain additional cases related to read errors, communications errors, or other anomalies may occur which can alter the flow of processing a read operation. For example, additional considerations may apply regarding which M of the N shares to read from upon initially accessing physical storage disks 206. Similar considerations apply with respect to subsequent secondary read requests to the physical storage devices in case those read requests fail as well.

FIG. 16 shows a flowchart of systems and methods 850 for writing block-level secured data according to a possible embodiment of the present disclosure. The systems and methods 850 as disclosed provide a basic example of a write operation, and similarly to the read operation of FIG. 15 additional cases and different operational flow may be used.

In the example systems and methods 850 disclosed, operational flow is instantiated at a start operation 852. Operational flow proceeds to a write request receipt module 854, which corresponds to receiving a primary write request from a client device (e.g. an application server as shown in FIGS. 3-4) at a secure storage appliance. The primary write request generally addresses a virtual disk, and includes a block of data to be written to the virtual disk.

Operational flow proceeds to an identity determination module 856, which determines the identity of the client device from which the primary write request is received. After determining the identity of the client device, the identity determination module 856 accesses a workgroup key based upon the identity of the client device and accesses the virtual disk at which the primary write request is targeted. Operational flow proceeds to a share determination module 858, which determines the number of secondary data blocks that will be created, and the specific physical disks on which those shares will be stored. The share determination module 858 obtains the session keys for each of the shares that are encrypted with the workgroup key obtained in the identity determination module 856 (e.g. locally, from a key manager, or from the physical disks themselves). These session keys for each share are decrypted using the workgroup key.

Operational flow proceeds to a data processing module 860, which provides to the parser driver 304 the share information, session keys, and the primary data block. The parser driver 304 operates to cryptographically split and encrypt the primary data block, thereby generating N secondary data blocks to be written to N shares accordance with the principles described above in the examples of FIGS. 8-9 and 13. Operational flow proceeds to a secondary write module 862 which transmits the share information to the physical storage devices for storage.

Operational flow proceeds to a metadata storage module 864, which updates a metadata repository by logging the data written, allowing the secure storage appliance to track the physical disks upon which data has been written, and with what session and workgroup keys the data can be accessed. Operational flow terminates at an end operation 866, which signifies completion of the write request.

As previously mentioned, in certain instances additional operations can be included in the system 850 for writing data using the secure storage appliance. For example, confirmation messages can be returned to the secure storage appliance confirming successful storage of data on the physical disks. Other operations are possible as well.

Figure 17:
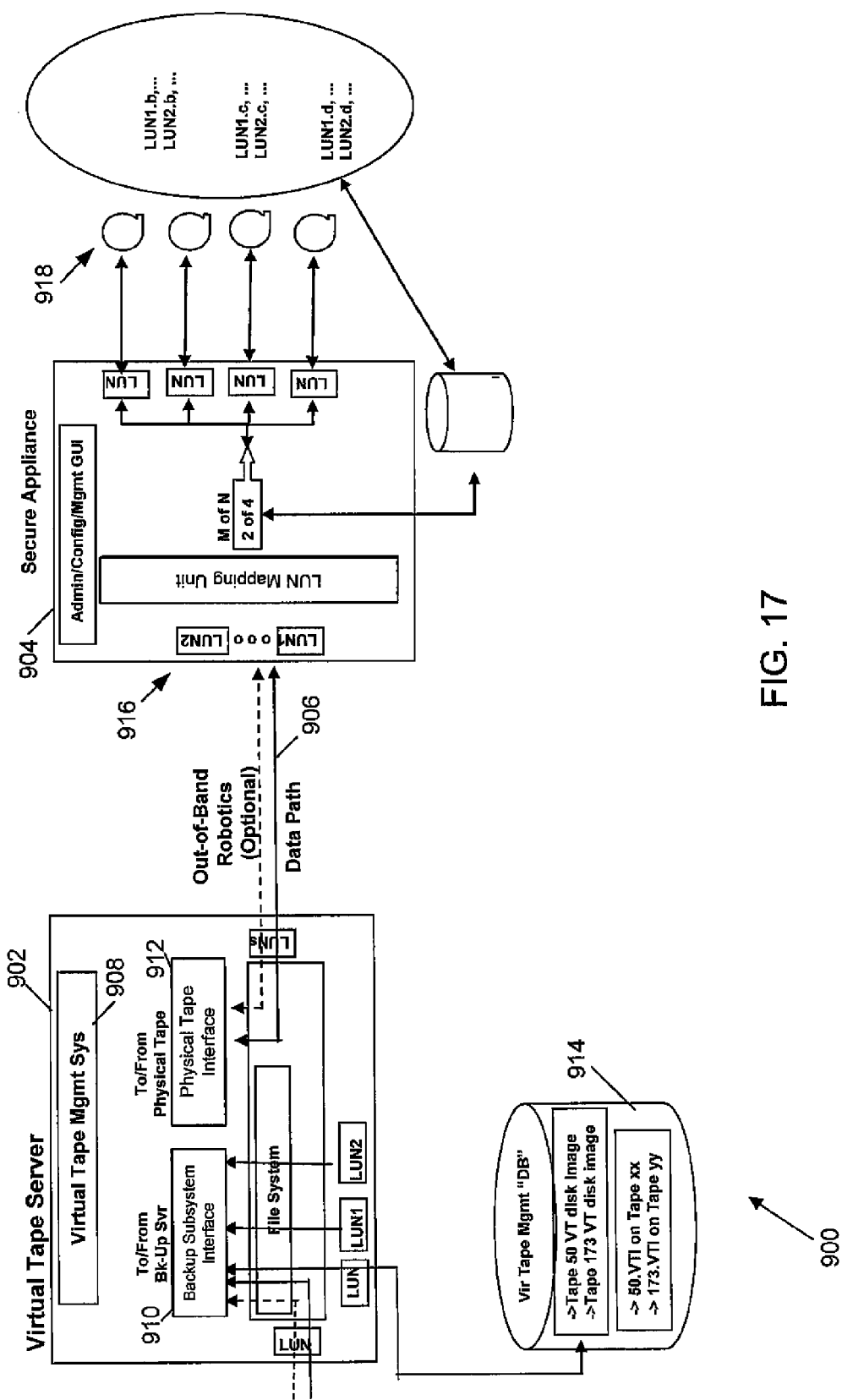
FIG. 17 shows a possible arrangement for providing secure storage data backup, according to a possible embodiment of the present disclosure.
Figure 18:
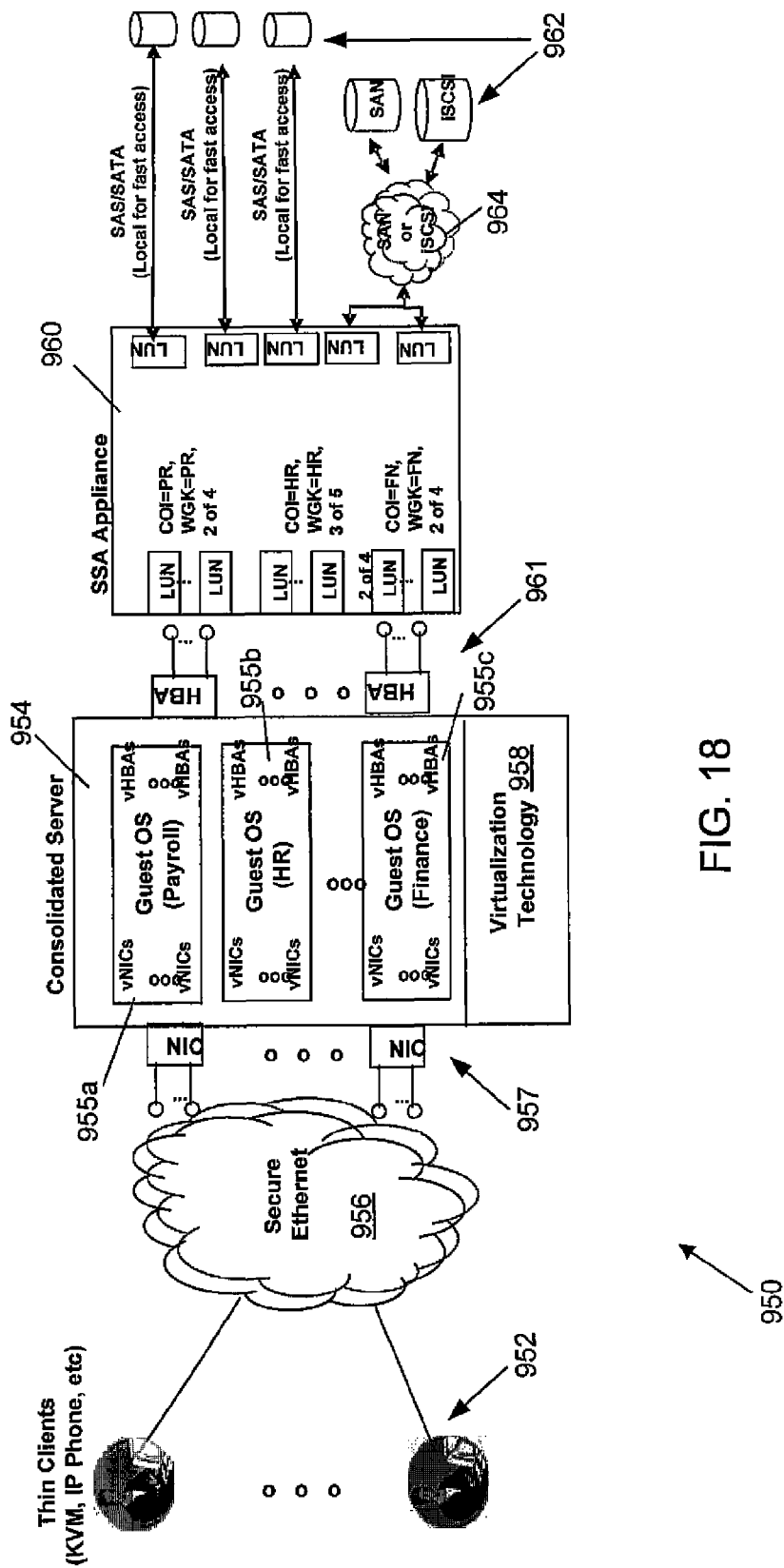
FIG. 18 shows a possible arrangement for providing secure storage for a thin client computing network, according to a possible embodiment of the present disclosure.

Now referring to FIGS. 17-18 of the present disclosure, certain applications of the present disclosure are discussed in the context of (1) data backup systems and (2) secure network thin client network topology used in the business setting. FIG. 17 shows an example system 900 for providing secure storage data backup, according to a possible embodiment of the present disclosure. In the system 900 shown, a virtual tape server 902 is connected to a secure storage appliance 904 via a data path 906, such as a SAN network using Fibre Channel or iSCSI communications. The virtual tape server 902 includes a management system 908, a backup subsystem interface 910, and a physical tape interface 912. The management system 908 provides an administrative interface for performing backup operations. The backup subsystem interface 910 receives data to be backed up onto tape, and logs backup operations. A physical tape interface 912 queues and coordinates transmission of data to be backed up to the secure storage appliance 904 via the network. The virtual tape server 902 is also connected to a virtual tape management database 914 that stores data regarding historical tape backup operations performed using the system 900.

The secure storage appliance 904 provides a virtual tape head assembly 916 which is analogous to a virtual disk but appears to the virtual tape server 902 to be a tape head assembly to be addressed and written to. The secure storage appliance 904 connects to a plurality of tape head devices 918 capable of writing to magnetic tape, such as that typically used for data backup. The secure storage appliance 904 is configured as described above. The virtual tape head assembly 916 provides an interface to address data to be backed up, which is then cryptographically split and encrypted by the secure storage appliance and stored onto a plurality of distributed magnetic tapes using the tape head devices 918 (as opposed to a generalized physical storage device, such as the storage devices of FIGS. 3-4).

In use, a network administrator could allocate virtual disks that would be presented to the virtual tape head assembly 916. The virtual tape administrator would allocate these disks for storage of data received from the client through the virtual tape server 902. As data is written to the disks, it would be cryptographically split and encrypted via the secure storage appliance 904.

The virtual tape administrator would present virtual tapes to a network (e.g. an IP or data network) from the virtual tape server 902. The data in storage on the tape head devices 918 is saved by the backup functions provided by the secure storage appliance 904. These tapes are mapped to the virtual tapes presented by the virtual tape assembly 916. Information is saved on tapes as a collection of shares, as previously described.

An example of a tape backup configuration illustrates certain advantages of a virtual tape server over the standard tape backup system as described above in conjunction with FIG. 2. In one example of a tape backup configuration, share 1 of virtual disk A, share 1 of virtual disk B, and other share 1's can be saved to a tape using the tape head devices 918. Second shares of each of these virtual disks could be stored to a different tape. Keeping the shares of a virtual tape separate preserves the security of the information, by distributing that information across multiple tapes. This is because more than one tape is required to reconstitute data in the case of a data restoration. Data for a volume is restored by restoring the appropriate shares from the respective tapes. In certain embodiments an interface that can automatically restore the shares for a volume can be provided for the virtual tape assembly. Other advantages exist as well.

Now referring to FIG. 18, one possible arrangement of a thin client network topology is shown in which secure storage is provided. In the network 950 illustrated, a plurality of thin client devices 952 are connected to a consolidated application server 954 via a secured network connection 956.

The consolidated application server 954 provides application and data hosting capabilities for the thin client devices 952. In addition, the consolidated application server 954 can, as in the example embodiment shown, provide specific subsets of data, functionality, and connectivity for different groups of individuals within an organization. In the example embodiment shown, the consolidated application server 954 can connect to separate networks and can include separate, dedicated network connections for payroll, human resources, and finance departments. Other departments could have separate dedicated communication resources, data, and applications as well. The consolidated application server 954 also includes virtualization technology 958, which is configured to assist in managing separation of the various departments' data and application accessibility.

The secured network connection 956 is shown as a secure Ethernet connection using network interface cards 957 to provide network connectivity at the server 954. However, any of a number of secure data networks could be implemented as well.

The consolidated application server 954 is connected to a secure storage appliance 960 via a plurality of host bus adapter connections 961. The secure storage appliance 960 is generally arranged as previously described in FIGS. 3-16. The host bus adapter connections 961 allow connection via a SAN or other data network, such that each of the dedicated groups on the consolidated application server 954 has a dedicated data connection to the secure storage appliance 960, and separately maps to different port logical unit numbers (LUNs). The secure storage appliance 960 then maps to a plurality of physical storage devices 962 that are either directly connected to the secure storage appliance 960 or connected to the secure storage appliance 960 via a SAN 964 or other data network.

In the embodiment shown, the consolidated application server 954 hosts a plurality of guest operating systems 955, shown as operating systems 955*a-c*. The guest operating systems 955 host user-group-specific applications and data for each of the groups of individuals accessing the consolidated application server. Each of the guest operating systems 955*a-c* have virtual LUNs and virtual NIC addresses mapped to the LUNs and NIC addresses within the server 954, while virtualization technology 958 provides a register of the mappings of LUNS and NIC addresses of the server 954 to the virtual LUNs and virtual NIC addresses of the guest operating systems 955*a-c*. Through this arrangement, dedicated guest operating systems 955 can be mapped to dedicated LUN and NIC addresses, while having data that is isolated from that of other groups, but shared across common physical storage devices 962.

As illustrated in the example of FIG. 18, the physical storage devices 962 provide a typical logistical arrangement of storage, in which a few storage devices are local to the secure storage appliance, while a few of the other storage devices are remote from the secure storage appliance 960. Through use of (1) virtual disks that are presented to the various departments accessing the consolidated application server 954 and (2) shares of virtual disks assigned to local and remote storage, each department can have its own data securely stored across a plurality of locations with minimal hardware redundancy and improved security.

Although FIGS. 17-18 present a few options for applications of the secure storage appliance and secure network storage of data as described in the present disclosure, it is understood that further applications are possible as well. Furthermore, although each of these applications is described in conjunction with a particular network topology, it is understood that a variety of network topologies could be implemented to provide similar functionality, in a manner consistent with the principles described herein.

Figure 19:
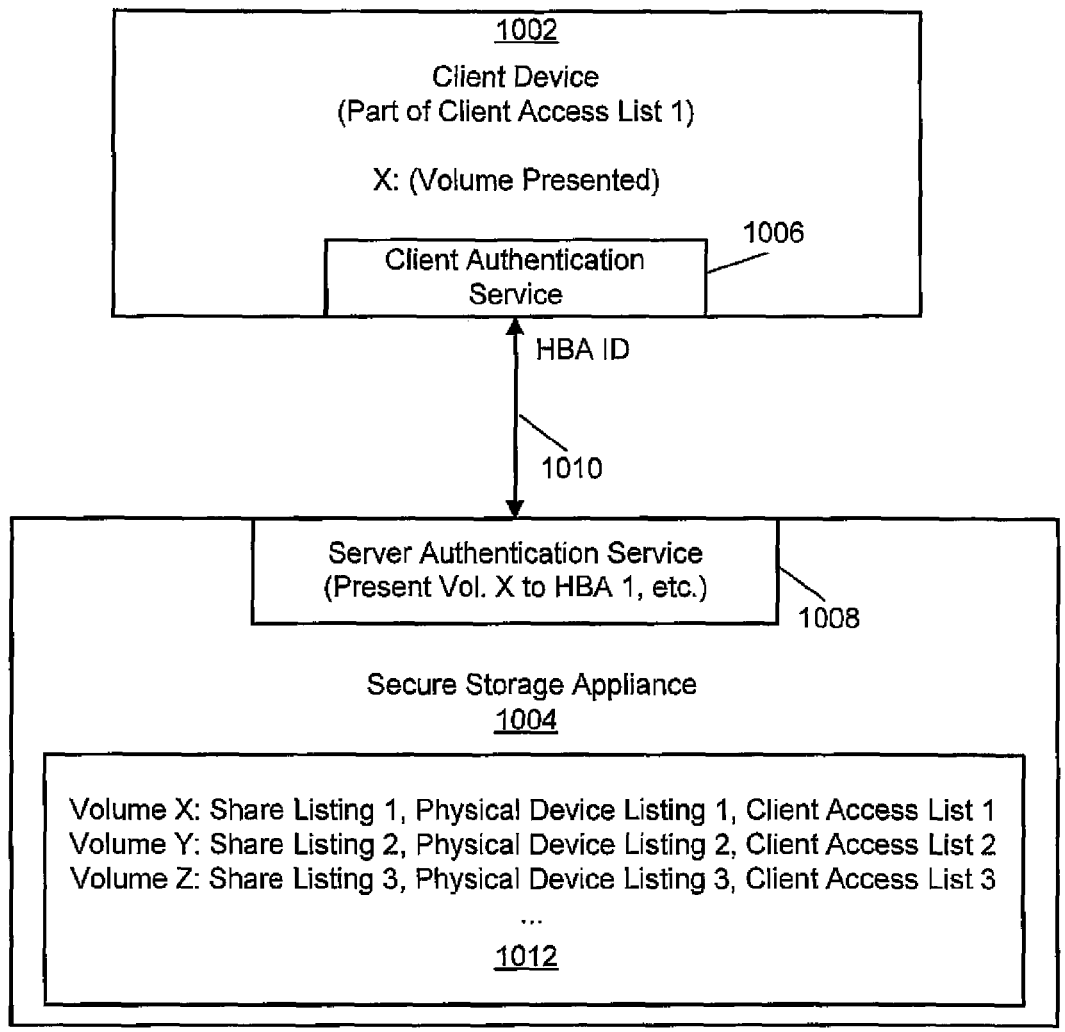
FIG. 19 shows a block diagram of aspects of an example connection between a client device and a secure storage appliance, according to a possible embodiment of the present disclosure.
Figure 20:
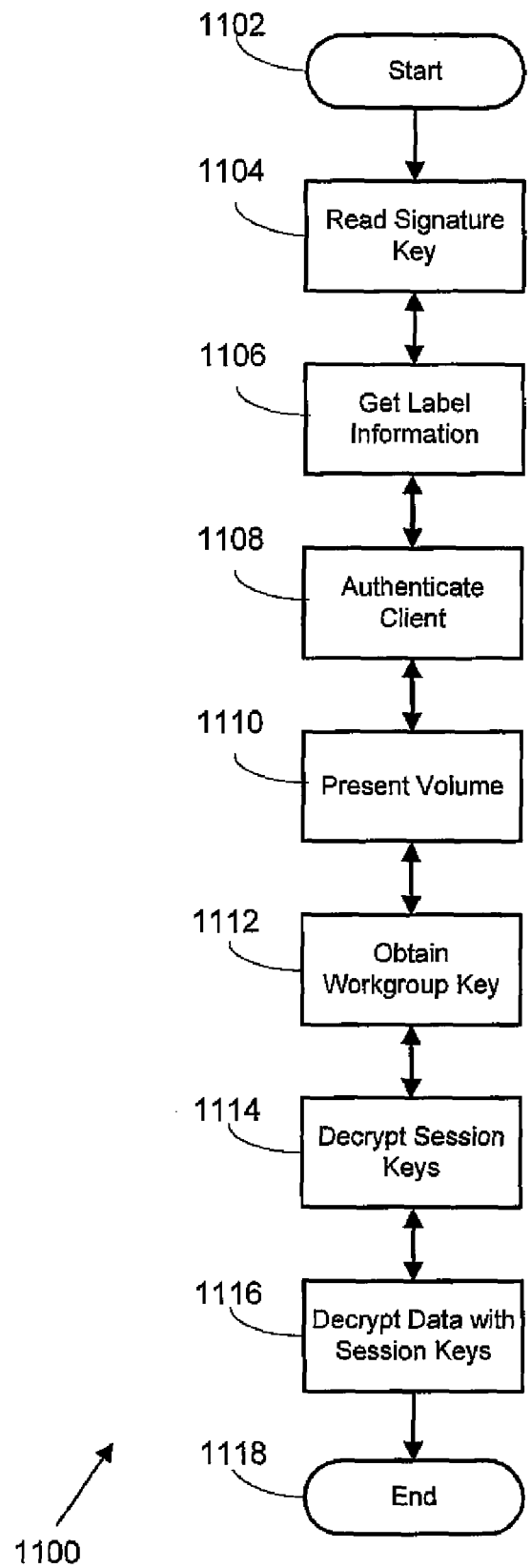
FIG. 20 shows a flowchart of methods and systems for securing and retrieving data from a physical storage device, according to certain embodiments of the present disclosure.
Figure 21:
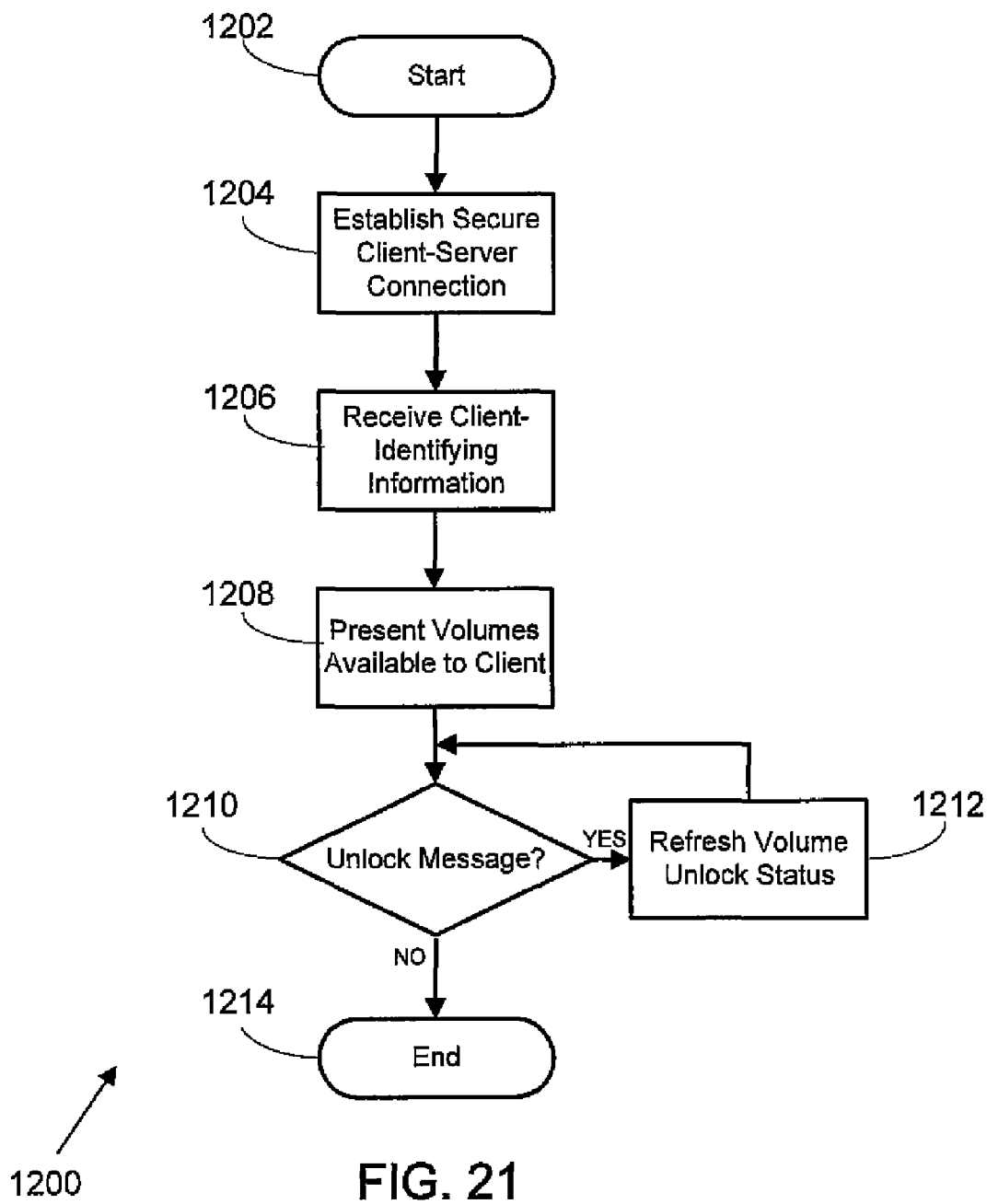
FIG. 21 shows a flowchart for methods and systems for presenting a virtual disk to a client device, according to a possible embodiment of the present disclosure.
Figure 25:
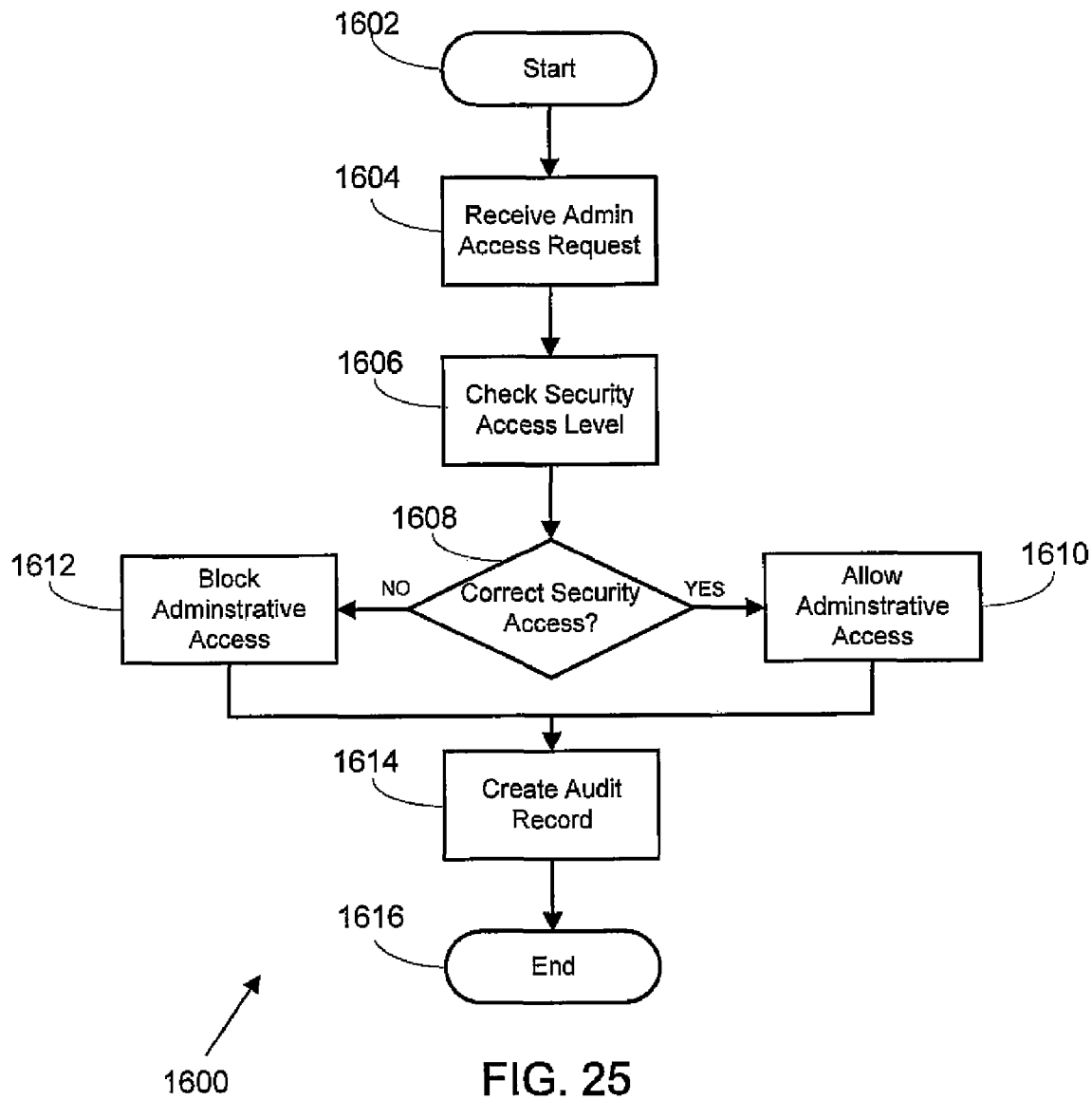
FIG. 25 shows a flowchart for methods and systems for accessing administrative settings in a secure storage appliance, according to a possible embodiment of the present disclosure.

Now referring to FIGS. 19-25, additional details regarding security of data stored using the systems and methods described above are provided. FIGS. 19-21 describe presentation of specific data to client devices (e.g. application servers or other devices), while FIGS. 22-23 describe key management in the context of the above systems. FIGS. 24-25 illustrates various administrative roles and methods of regulating administrative access rights, as provided in the systems and networks of the present disclosure.

FIG. 19 shows a block diagram of aspects of an example connection between a client device and a secure storage appliance, according to a possible embodiment of the present disclosure. The block diagram illustrates a portion 1000 of a network in which secure communication is required. In the embodiment shown, the portion 1000 of a network is disclosed which includes a client device 1002 and a secure storage appliance 1004; however it is understood that the portion 1000 can be included in (or is embodied in) the various client-secure storage appliance connections previously described.

The client device 1002 includes a connection module 1006, which provides, when installed at a client, client-side authentication software systems for communicating with the secure storage appliance 1004.

The connection module 1006 establishes a secure connection with management services on the secure storage appliance 1004 using either Kerberos or certificate-based authentication. In embodiments using Kerberos authentication, the client device 1002 may be located within a trusted domain (e.g. a common domain with the secure storage appliance or another trusted domain). The connection module 1006 can, in such instances, use a remote procedure call or other method to communicate with the secure storage appliance 1004. Alternatively, a secure socket layer may be used in conjunction with certificate-based authentication.

In certain embodiments, the connection module 1006 can transmit the authentication information to the secure storage appliance 1004 through a proxy (not shown). The proxy can relay requests transmitted between the client device 1002 and secure storage appliance 1004.

The connection module 1006 passes identifying information about the client device to the secure storage appliance for verification, and exchanges encryption keys (e.g. public keys of a public/private key pair) used for encryption of messages passed between the client and secure storage appliance. In certain embodiments, the identifying information includes the name of the client device, as well as an identifier of a host bus adapter on the client device (i.e. the world wide name of the host bus adapter). The connection module 1006 also receives configuration information, and can perform inquiries on virtual disks presented to it by the secure storage appliance 1004.

A server connection module 1008 residing on the secure storage appliance 1004 provides complementary authentication connectivity. The server connection module 1008 establishes a secure connection with a client device, exchanging encryption keys (e.g. public keys of a public/private key pair) with the client, to assist in securing data communicated between the devices. The server connection module 1008 receives connection requests from a client, and determines whether to authenticate that client.

Once authentication occurs, the connection module 1006 on the client device 1002 can periodically send messages to the server connection module 1008, to maintain connection between the devices such that the server device continues to present the volume to the client device. Additional details regarding operation of the server connection module and presentment of data to the client device are discussed below in conjunction with FIG. 21.

As illustrated, the client device 1002 and secure storage appliance are connected by a secure data connection 1010, such as can be established over a storage area network, as described above. In such an embodiment, the secure data connection 1010 can correspond to a connection over a data network, such as a connection between host bus adapters in a Fibre Channel network, or addressable iSCSI ports, as described above.

In the embodiment shown, the secure storage appliance 1004 hosts a table 1012 containing a list of client devices capable of connecting to a specific volume. The client access information can be based on a name of the client device 1002, or a name or address of a communication connection (e.g. the host bus adapter) or other client-identifying information. The table 1012 including client authentication information can optionally also incorporate or be integrated into the information related to volume and share mapping, as illustrated. In the example shown, three volumes are available as mapped to physical devices and shares, listed as volumes X, Y, and Z, as indicated in the table 1012 available to the secure storage appliance 1004. The client device 1002 requests access to the secure storage appliance 1004, which finds the identity of the client device within "Client Access List 1", and presents volume X to that client device, for example by using the methods and systems of FIG. 21, below. If the client device is also identified within other client access lists, additional volumes may be authorized to be presented as well.

Although the table 1012 is shown as having a specific form, it is understood that the data residing in the table can take many forms and be arranged in many ways. For example, the table 1012 could be embodied in a file, database, or directory system, and could include more or less information than that shown.

FIG. 20 shows a flowchart of methods and systems 1100 for securing and retrieving data from a physical storage device, according to certain embodiments of the present disclosure. The methods and systems 1100 as disclosed herein allow access of data (e.g. reading or writing of data) to or from a physical storage device hosting a share of a volume, as illustrated in FIG. 13, above.

Operational flow in the system 1100 is instantiated at a start operation 1102. The start operation generally corresponds to initial access of a share, such as upon associating a secure storage appliance with a physical storage device and creation of a share, or upon introducing a secure storage appliance into a network having preexisting shares, such that volumes can be associated with the secure storage appliance as described above. As described herein, the secure storage appliance can be any of the embodiments of secure storage appliances described above, and can connect to a client device as described in conjunction with FIG. 19. The client device can be any of a number of types of client devices previously described which are capable of authenticating its identity to a secure storage appliance.

Operational flow proceeds to a signature key module 1104, which obtains a signature key, and uses that signature key to decrypt and read signature information related to a share. In various embodiments, the signature key can be held by the secure storage appliance, or by a key server communicatively connected thereto. The signature information is unique to each share of a volume, and therefore multiple signature keys may be required to be used across multiple shares to obtain sufficient information about the shares associated with a volume. In certain embodiments, the signature information can include information that can be used to identify the physical device upon which data (i.e. the share) is stored, as is required to construct the volume from each of the shares. In certain embodiments, the signature information can correspond to the signature 706 associated with share 700a of FIG. 13.

Operational flow proceeds to a label module 1106. The label module 1106 accesses the share label associated with each share, and obtains information about the particular share. For example, this can include the volume name and serial number of the physical volume on which the share is stored. This can also include information about the virtual volume with which the share is associated. Other information can be included as well.

Operational flow proceeds to an authentication module 1108. The authentication module 1108 determines whether a client is authorized to access data associated with a volume, such as the volume for which information is retrieved as related to modules 1104-1106, above. The authentication module can, in certain embodiments, establish a secure connection between the client device and the server device, such that messages communicated between the client device and the server cannot be intercepted or observed. Example methods of authentication include use of Kerberos or certificate-based authentication, as described below in conjunction with FIG. 21.

Operational flow proceeds to a volume presentation module 1110. The volume presentation module 1110 presents to the client device a volume that client is authorized to view. The volume, as previously described, is associated with a plurality of shares, for each of which the signature and header information has been accessed to determine its availability. At this point, a client device can address data requests, such as read requests, write requests, or other I/O requests. Other methods and systems can be used to ensure proper presentation of one or more available volumes to a user. Additional details regarding authentication and volume presentation to a client device are described in conjunction with FIG. 21, below.

Operational flow proceeds to a workgroup key module 1112. The workgroup key module 1112 accesses a workgroup key associated with the authenticated client. Each client can be associated with one or more workgroup keys, each of which is associated with one or more volumes. The workgroup keys are used to allow the client access to a virtual disk representing data stored on the volume.

Operational flow proceeds to a session key module 1114. The session key module 1114 accesses a session key for use in accessing data (e.g. using the data module 1116, below). The session key module 1114 can access the session key from the share directly, such as by reading a session key from one of the headers in the share (e.g. as illustrated in FIG. 13). Alternatively, if the session key has previously been accessed, the session key may be accessible by a secure storage appliance locally or from a database of keys used by the secure storage appliance. The session key module 1114 decrypts the session key using the workgroup key obtained using the workgroup key module 1112.

In embodiments in which the session key is split and stored across a plurality of shares, the session key module 1114 accesses one or more shares, as necessary to reconstitute the session key, and then decrypts the split session key portions and reconstitutes the session key in a manner analogous to the methods used on data herein.

Operational flow proceeds to a data module 1116. The data module 1116 operates on data in response to a data request received from the client device. In the case of a read data request, the data module can encrypt data with a session key, by finding appropriate session keys associated with shares at which the data is cryptographically split and stored. In the case of a write data request, the data module 1116 can decrypt data with an associated session key, and provide that data to the secure storage appliance for reconstitution with data from other shares to provide requested data back to a client device. Typically, at least one of the workgroup key module 1112, the session key module 1114, or the data module 1116 is executed in response to or in advance of a data request from the client device, such that, when a data request (e.g. a read or write request) is made, a block of data can be accessed, decrypted/encrypted, and split/reconstituted to be provided to the client device or stored at a share. Operational flow proceeds to an end operation 1118, which signifies completion of handling of a data request relating to the share.

FIG. 21 shows a flowchart for methods and systems 1200 for presenting a virtual disk to a client device, according to a possible embodiment of the present disclosure. As shown, the methods and systems 1200 prevent unauthorized client devices from accessing data, while allowing authorized client devices to access data. This is accomplished by selectively presenting virtual disks to client devices, each of the virtual disks associated with a volume and defining the authorized client devices. By presenting or hiding data on a virtual disk basis, each volume can be presented or masked from a user, allowing that user to view only their data stored at a physical disk even when other users or user group's data is also stored on the same physical disk (e.g. in the case of more than one volume sharing a physical disk by each storing a share on the physical disk). The methods and systems 1200 help prevent an attacker from spoofing a client system by presenting client identification information identical to an authorized client device (e.g. by presenting a host bus adapter with a world wide name identical to the one on an authorized client device).

Operational flow within the system 1200 is instantiated at a start operation 1202, which corresponds to initial operation of a secure storage appliance in conjunction with a client device and a back end data storage network, such as in the embodiments disclosed above in conjunction with FIGS. 3-16. Operational flow proceeds to a connection module 1204, which corresponds to creation of a secure connection between a client device and a secure storage device. The secure connection can be created using Kerberos or certificate-based authentication, as described above in conjunction with FIG. 19. The secure connection can use exchanged keys, such as exchanged public keys of public/private key pairs of the client device and secure storage appliance, to create a secure session such that the communication between the two systems cannot be eavesdropped on, and such that a third, unauthorized system cannot impersonate a legitimately authorized client device. Other methods of authentication can be used as well.

Operational flow proceeds to a client identification module 1206. The client identification module 1206 receives an indication from a client identifying the client, such as by providing a name of the client, a name of a communicative connection of the client (e.g. a port address or name of a host bus adapter), or other identifying information. The client identification module also optionally receives an indication of a volume to which the client is requesting access (e.g. by attempting access of a virtual disk). The client identification module 1206 uses this information to determine whether the client is authorized to access the volume (or any volume) available to be hosted by the secure storage appliance.

Operational flow proceeds to a volume presentment module 1208, which corresponds to the secure storage appliance determining whether the client device is authorized and responding accordingly by presenting (or denying access to) contents of a volume, as associated with the virtual disk. The volume presentment module 1208 presents the volume to an authorized client device as a virtual disk, such that the volume (which is spread across shares on a plurality of physical storage devices) appears as a unitary storage device. In certain embodiments in which it is determined that the client is not authorized to view the contents of a volume, the secure storage appliance can return status information about the volume to the client, but will prevent data access or viewing of contents of the volume. In other embodiments, the volume is blocked from presentment to the client system entirely. Other embodiments are possible as well.

Operational flow proceeds to an unlock operation 1210, which determines whether a volume presented to a client device should remain presented to the client device. Typically a client device will periodically transmit unlock messages to a secure storage appliance during a period of time in which the client device is operational or is using the volume hosted by the secure storage appliance. Likewise, alongside data requests associated with the volume, the client can transmit authentication information that indicates that the client is continuing to access the volume. At the secure storage appliance, the unlock operation 1210 determines whether an unlock message has been received within a predetermined amount of time (e.g. within 1-2 minutes, or more frequently depending upon the desired bandwidth of the overall network to be consumed with unlock messages). If an unlock message has been received, operational flow branches "yes" and proceeds to a return module 1212, which refreshes the unlocked status of the volume, and the secure storage appliance continues to present the volume to the client device. The system 1200 repeats operation of the unlock operation and return module 1212, thereby maintaining availability of the volume to the client, for the time during which the client requests access to the volume. During this time, the secure storage appliance will receive and respond to data requests (e.g. read and write requests) related to the volume.

If no unlock message has been received at the secure storage appliance within the predetermined amount of time, operational flow branches "no" and proceeds to an end operation 1214, indicating that the volume ceases to be presented to the client device.

In certain embodiments, upon ceasing to present the volume to the client device, the client can still obtain status information about the volume from the secure storage appliance, for example by requesting status information from the secure storage appliance over a still-open secure connection generated by the connection module 1204. In other embodiments, upon ceasing to present the volume to the client device, the secure connection is terminated as well (assuming that no other volumes are currently being presented to the client device).

Figure 22:
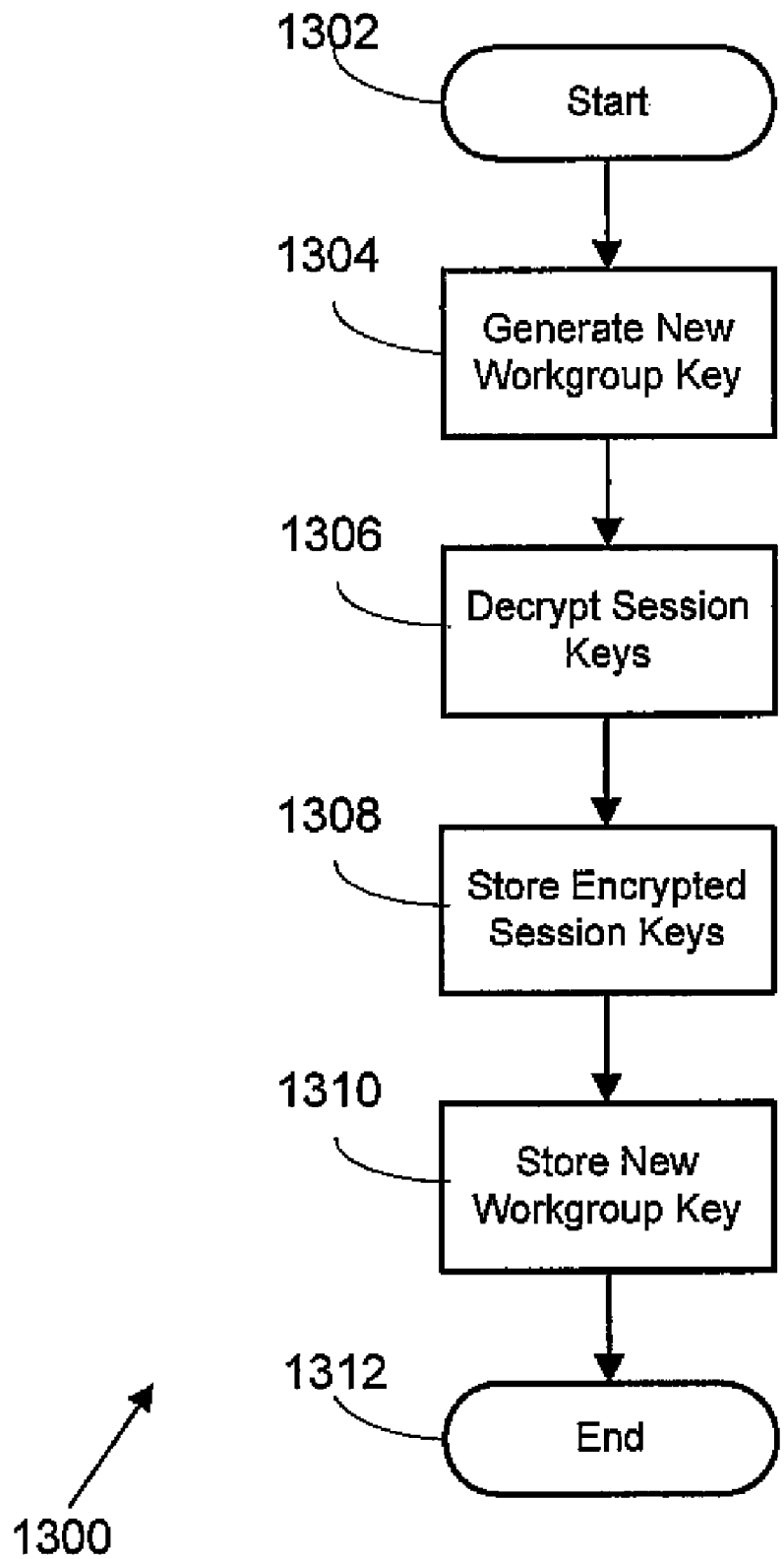
FIG. 22 shows a flowchart for methods and systems for replacing a workgroup key used to secure data stored using a secure storage appliance, according to certain embodiments of the present disclosure.
Figure 23:
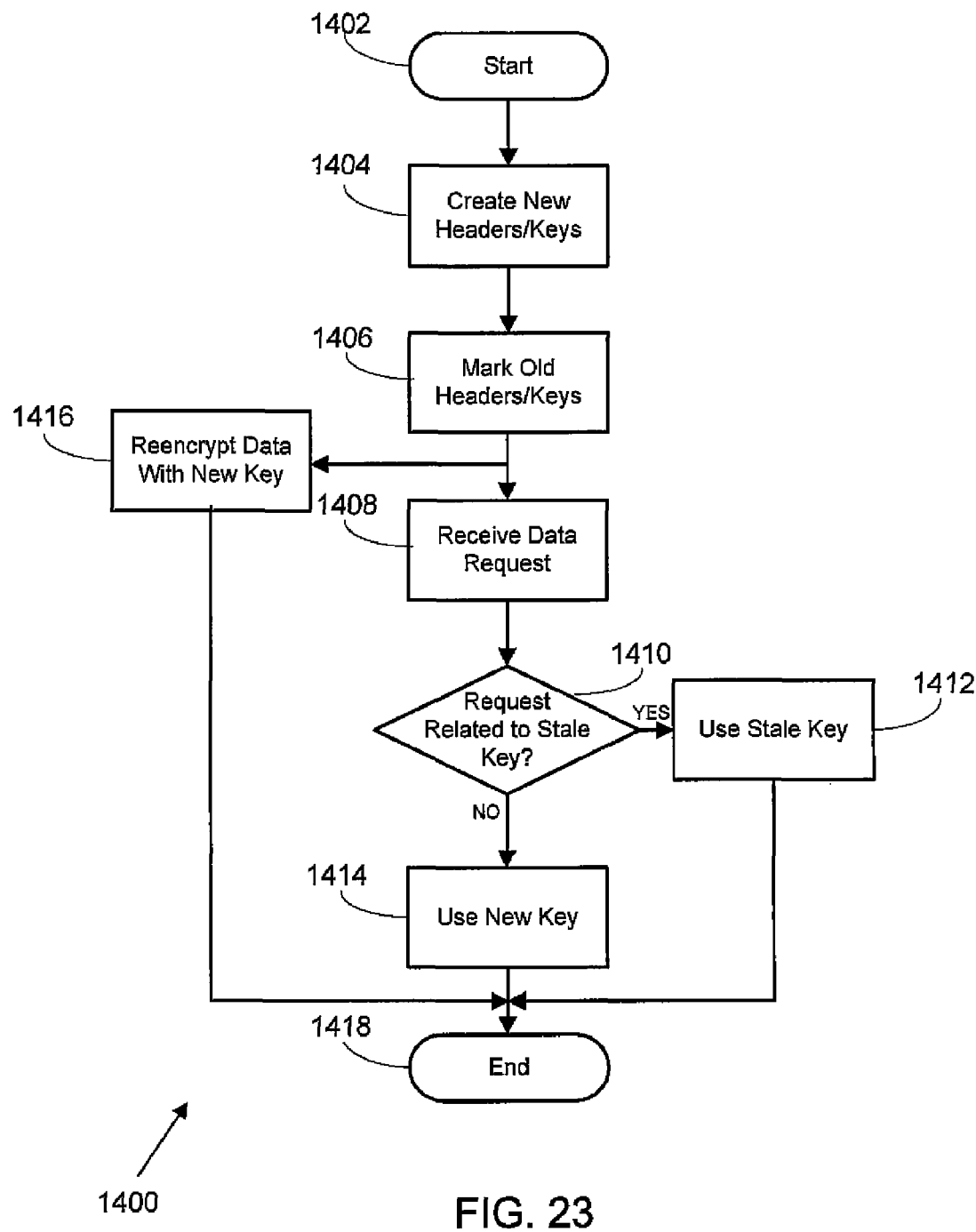
FIG. 23 shows a flowchart for methods and systems for replacing a session key used to secure data stored using a secure storage appliance, according to certain embodiments of the present disclosure.

Now referring to FIGS. 22-23, systems and methods for updating encryption keys in a secure data storage network such as those described herein are explained in further detail. FIG. 22 shows a flowchart for methods and systems 1300 for replacing a workgroup key used to secure data stored using a secure storage appliance, according to certain embodiments of the present disclosure. The methods and systems 1300 as illustrated provide a process by which security can be strengthened by allowing a secure storage appliance or administrative device to refresh workgroup keys, minimizing the chance that such keys can be possessed by an unauthorized user. If an unauthorized user has access to a workgroup key, that user may be able to access one or more virtual disks associated with that key. For example, a user at a client device may be authorized to access certain virtual disks at a low security access level, having little access or data editing capabilities; by obtaining a workgroup key from another user, that first (now unauthorized) user of the wrongly-obtained workgroup key has an increased ability to access a virtual disk associated with a second (authorized) user, thereby compromising data stored in the volume associated with the wrongly-obtained workgroup key.

The methods and systems 1300 are instantiated at a start operation 1302, which corresponds to initiation of a key updating process, as could be triggered by an administrator or based on a scheduled key updating operation noted at a key server, secure storage appliance, or other component of a secure data storage network as previously described. Operational flow proceeds to a key generation module 1304, which generates a new workgroup key to be used in place of a preexisting workgroup key. The key generation module 1304 typically operates on a key server or secure storage appliance to generate a key to be used as a replacement to one or more preexisting workgroup keys associated with a selected virtual disk and volume.

Operational flow proceeds to a decryption module 1306, which corresponds to decryption of each of the session keys at each share on a physical disk that is encrypted with the previously-used workgroup key. The key server or secure storage appliance determines all of the shares associated with volumes and virtual disks associated with a workgroup key. Each share is accessed, and each of the headers associated with the shares (e.g. headers containing session keys or cryptograpghically split portions of session keys) that are encrypted using the workgroup key are decrypted using that key.

At this point in the system 1300, all of the session keys that were previously encrypted with the session key are now decrypted, and held by the secure storage appliance and/or key server associated with the appliance. Operational flow proceeds to an encrypted key storage module 1308, which corresponds to encryption with the new workgroup key of each of the session keys decrypted with the decryption module 1306. The encrypted key storage module 1308 stores the newly-encrypted session keys within the shares on physical disks. In embodiments in which the session key is cryptographically split prior to storage, the encrypted key storage module 1308 also cryptographically splits the session key across each of the shares associated with the volume associated with the session key, e.g. prior to the encryption of such portions of the session key.

Operational flow proceeds to a workgroup key storage module 1310, which corresponds to storage of the workgroup key at a key server used for managing key and virtual disk information. The workgroup key storage module 1310 updates information at a secure storage appliance, physical disk, and/or key server indicating that the new workgroup key is used to decrypt the session keys or session key portions. The workgroup key storage module 1310 also optionally deletes (or schedules for deletion) the previously-used workgroup key. Operational flow terminates at an end operation 1312, signifying completion of the re-keying process with respect to a workgroup key.

In certain embodiments, the various modules of the system 1300 can be operated in a different order, or could be operated in parallel. For example, the decryption module 1306 and the encrypted key storage module 1308 can operate in tandem to access, decrypt and reencrypt session keys on a one-by-one basis. Other operational flows are possible as well FIG. 23 shows a flowchart for methods and systems 1400 for replacing a session key used to secure data stored using a secure storage appliance, according to certain embodiments of the present disclosure. The methods and systems 1400 illustrated provide a further process (alongside process 1300 of FIG. 22) by which security can be strengthened by allowing a secure storage appliance or administrative device to refresh session keys, minimizing the chance that such keys can be obtained and used to decrypt data on a share. If an unauthorized user has access to a decrypted session key, that user may be able to access data on a share of a physical storage device, thereby accessing a portion of the information (i.e. the portion included in the share) required to reconstruct a volume.

The methods and systems 1400 are instantiated at a start operation 1402, which corresponds to initiating a process to replace one or more session keys associated with a share stored on a physical storage device. The process can, for example, be initiated by a scheduled operation on a secure storage appliance or key manager, or can be manually triggered by an administrator having sufficient access rights. Operational flow proceeds to a header creation module 1404, which creates new header information to be stored in a share, including a new session key. The header creation module 1404 stores the header information in a reserved empty header location in the share, as indicated above in conjunction with FIG. 13. The header creation module 1404 can be performed, for example, by a secure storage appliance or key manager within a secure data storage network. In embodiments in which the session key is split across each of the shares, the header creation module 1404 creates a new header containing cryptographically split portions of each session key to be stored in the share.

Operational flow proceeds to a marking module 1406, which operates to mark a preexisting header as a previous or "stale" header to be replaced by the header and session key generated by the header creation module 1404.

From the marking module 1406, operational flow proceeds both to a request module 1408 and a sideband reencryption module 1416. The sideband reencryption module 1416 initiates a sideband operation by which all of the data that is stored in a share and encrypted with a session key of the stale header information (referred to herein as a "stale" session key), is decrypted with that key, reencrypted using a new session key created by the header creation module 1404, and restored within the share in its updated state.

The procedure performed by the sideband reencryption module 1416 can take substantial time, and may be performed during operation of a secure data storage network. Therefore, data requests may be received by a secure storage appliance and targeted at the share in which the session key is being updated. In the case of a write request, the data to be written will be encrypted with the newly-created session key in the new header. In the case of a read request, the receive data request module 1408 corresponds to receipt of a data request (e.g. a read request) at a secure storage appliance that is targeted for data in the share having a session key replaced. A request assessment operation 1410 determines whether the read request addresses data stored using the new session key or the stale session key. This can be accomplished, for example, by reading the block of data and the associated identifier of a session key to be used to decrypt the data (as referenced in conjunction with the secondary data blocks 712 of FIG. 13, above). If the request assessment operation 1410 determines that the stale session key was used, operational flow branches "yes" to a stale key module 1412. If the request assessment operation 1410 determines that a new session key was used, operational flow branches "no" to a new key module 1414.

Both the stale key module 1412 and the new key module 1414 operate to decrypt the requested data block, with each using a respective stale or new session key to decrypt the data for reconstitution of a primary data block to be returned to a client device. Operational flow proceeds to an end operation 1418, which corresponds to completion of key replacement (e.g. by the sideband reencryption module 1416) and any intervening data read requests.

Now referring to FIGS. 24-25, various details of administrative roles available within a secure data storage network are described, as well as methods of managing administrative access to settings of one or more secure storage appliances. FIG. 24 shows a hierarchical arrangement 1500 of administrative access rights useable in a secure data storage network, according to a possible embodiment of the present disclosure. The arrangement 1500 includes a plurality of administrative access levels and associated settings allowed to be altered by administrative users of the secure data storage networks and systems herein at the corresponding access level.

In the embodiment shown, the arrangement 1500 presents a hierarchy of administrative access levels, including a security administrator 1502, a domain administrator 1504, an administrator 1506, an audit administrator 1508, a crypto administrator 1510, a user 1512, and a guest 1514. Other administrative access levels are possible as well. The security administrator access level 1502 allows the administrative user to edit global security settings, such as by assigning specific administrative operations and/or security settings for each of the administrative access levels. The security administrator access level 1502 also can be allowed to edit administrative access levels of other specific users and define security groups of users having common administrative access levels. The domain administrator access level 1504 allows the administrative user to control the creation and deletion of accounts and account groups within a domain. The administrator access level 1506 allows the administrative user to create and destroy volumes or groups of users, to the extent allowed by the security administrator. The audit administrator access level 1508 allows the administrator to alter audit logs. The crypto administrator access level 1510 allows the administrator to control access to the various keys available within the secure data storage network (e.g. the signature keys, workgroup keys, and session keys described above). The user access level 1512 allows the user to access data on volumes presented to that user, as configured by an administrator having such capabilities (e.g. having administrator access 1506 or higher). The guest access level 1514 allows a user to monitor the status of devices managed within a secure data storage network, but prevents access of data within the network.

In certain embodiments, the various administrative access levels are hierarchical and inherit each of the rights of all lower administrative access levels. This provides for a centralized administrative scheme, which, in certain circumstances, may subject a network to data vulnerability, based on the ability to access an account of a single security administrator. So, in alternative embodiments, the various administrative access levels do not inherit the administrative rights of other lower access levels, and another administrative user may be denied access to a security group or denied the capability of performing an administrative operation unless an appropriate administrative access level is individually assigned to a user. This can help prevent data vulnerabilities by deterring assignment of all security rights to a single administrator. Distributed administrative access rights (rather than centralized administrative access rights) can also help prevent conflict between administrator operations that may be occurring. For example, an administrator having audit administrator access level 1508 may require the ability to edit audit logs, whereas other administrators may wish to edit audit records but should not be provided such an opportunity due to the possibility of editing over the audit administrator or tampering with audit logs. Other arrangements of administrative access are possible as well.

FIG. 25 shows a flowchart for methods and systems 1600 for accessing administrative settings in a secure storage appliance, according to a possible embodiment of the present disclosure. The methods and systems 1600 provide a process by which administrative access can occur, whereby each administrative access is assessed to determine whether appropriate administrative access rights are associated with the administrative user requesting the administrative operation.

Operational flow is instantiated at a start operation 1602, which corresponds to a user attempting to access one or more administrative settings of a secure storage appliance within a secure data storage network, such as the various networks described herein. Operational flow proceeds to a receive access request module 1604, which corresponds to receipt of the access request at a secure storage appliance or administrative console connected thereto. The access request received via the receive access request module 1604 includes an identification of the user attempting administrative access, such as a login name and password, biometric information (e.g. fingerprint) or other reliable identification information. The receive access request module 1604 also identifies the specific administrative action to be performed. Operational flow proceeds to a security check module 1606, which compares the received identification information against a database of known administrators.

A security assessment module 1608 determines whether the user has sufficient access rights to perform a requested operation. A user may or may not have sufficient access rights to perform an administrative action in a secure data storage network based upon (1) the administrative access rights available to the user and (2) the specific administrative action requested to be taken. For example, a user having "crypto administrator" access rights, as defined in FIG. 24, would be able to initiate the key replacement operations described in FIGS. 22-23, whereas a user having "guest" access rights would not have such a right. Similarly, the user having the "crypto administrator" access rights would not be able to create or destroy volumes or shares within the secure data storage network, whereas an individual having "domain administrator" or "administrator" access rights would be able to edit volume arrangements. Other examples are apparent as well, and are dependent upon the number and type of different administrative access functions provided, as well as the number and type of administrative access levels defined.

If it is determined that the user has sufficient access rights to perform the requested administrative operation, operational flow branches "yes" and proceeds to an allowance module 1610, which allows performance of the administrative operation. In contrast, if it is determined that the user does not have sufficient access rights (e.g. the user is not an administrator or otherwise is not an administrator having the specific right to perform the administrative operation requested), operational flow branches "no" and proceeds to a block module 1612, which blocks performance of the administrative operation. From either the allowance module 1610 or the block module 1612, operational flow continues to an audit record module 1614, which records the administrative access attempt and action taken. An end operation 1616 corresponds to a completed access attempt to perform an administrative operation (successfully or unsuccessfully).

It is understood that, using the systems and methods of FIGS. 24-25, multiple types of hierarchies of administrative access rights can be created. For example, in certain embodiments, a security administrator has access to and can perform any of a number of administrative operations allowed within the secure data storage network. In other embodiments, the rights to perform of administrative operations are to be dispersed to different administrators, and the security administrator can grant or deny rights to perform administrative operations, but cannot perform such operations themselves. Likewise, other administrative rights can be either collected or dispersed among a plurality of administrators having different administrative access levels.

It is recognized that the above networks, systems, and methods operate using computer hardware and software in any of a variety of configurations. Such configurations can include computing devices, which generally include a processing device, one or more computer readable media, and a communication device. Other embodiments of a computing device are possible as well. For example, a computing device can include a user interface, an operating system, and one or more software applications. Several example computing devices include a personal computer (PC), a laptop computer, or a personal digital assistant (PDA). A computing device can also include one or more servers, one or more mass storage databases, and/or other resources.

A processing device is a device that processes a set of instructions. Several examples of a processing device include a microprocessor, a central processing unit, a microcontroller, a field programmable gate array, and others. Further, processing devices may be of any general variety such as reduced instruction set computing devices, complex instruction set computing devices, or specially designed processing devices such as an application-specific integrated circuit device.

Computer readable media includes volatile memory and non-volatile memory and can be implemented in any method or technology for the storage of information such as computer readable instructions, data structures, program modules, or other data. In certain embodiments, computer readable media is integrated as part of the processing device. In other embodiments, computer readable media is separate from or in addition to that of the processing device. Further, in general, computer readable media can be removable or non-removable. Several examples of computer readable media include, RAM, ROM, EEPROM and other flash memory technologies, CD-ROM, digital versatile disks (DVD) or other optical storage, magnetic cassettes, magnetic tape, magnetic disk storage or other magnetic storage devices, or any other medium that can be used to store desired information and that can be accessed by a computing device. In other embodiments, computer readable media can be configured as a mass storage database that can be used to store a structured collection of data accessible by a computing device.

A communications device establishes a data connection that allows a computing device to communicate with one or more other computing devices via any number of standard or specialized communication interfaces such as, for example, a universal serial bus (USB), 802.11 a/b/g network, radio frequency, infrared, serial, or any other data connection. In general, the communication between one or more computing devices configured with one or more communication devices is accomplished via a network such as any of a number of wireless or hardwired WAN, LAN, SAN, Internet, or other packet-based or port-based communication networks.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A system for administrative management of a secure data storage network utilizing cryptographically splitting data as it is stored and retrieved from storage devices, the system comprising:
a secure storage appliance configured to host a plurality of volumes, each volume associated with a plurality of shares stored on a corresponding plurality of physical storage devices and having a plurality of volume management settings;
wherein each volume is accessible by a group of one or more users, each user assigned an administrative access level, the group of one or more users defines a separate community of interest;
wherein the volume management settings are editable by a first user from the group of one or more users associated with the volume and assigned an administrative access level sufficient to edit the volume management settings;
wherein the volume management settings are inaccessible by a second user from outside the group of one or more users associated with the volume and assigned an administrative access level at least equal to that of the first user;
wherein the cryptographically splitting data utilize a plurality of encryption keys to create a plurality of separate community of interest data sets in which the primary write requests and corresponding plurality of secondary write request are members of the community of interest associated with the one of the plurality of encryption keys used in the write requests.

2. The system of claim 1, wherein the volume management settings are inaccessible by a third user from among the group of one or more users associated with the volume and assigned an administrative access level lower than that of the first user.

3. The system of claim 1, wherein the administrative access level is selected from among a group of administrative access levels.

4. The system of claim 1, wherein the volume management settings include user rights relating to the volume.

5. The system of claim 1, wherein the volume management settings include an ability to create or destroy volumes.

6. A system for administrative management of a secure data storage network network utilizing cryptographically splitting data as it is stored and retrieved from storage devices, the system comprising:
a secure storage appliance configured to host a plurality of volumes, each volume associated with a plurality of shares stored on a corresponding plurality of physical storage devices and having a plurality of volume management settings;
a security group definition designating a plurality of security groups, each security group associated with a volume and assigned to a security administrator, wherein volume management settings of a volume associated with one of the plurality of security groups are editable by the security administrator associated with the security group, the security group of one or more users defines a separate community of interest;
wherein the cryptographically splitting data utilize a plurality of encryption keys to create a plurality of separate community of interest data sets in which the primary write requests and corresponding plurality of secondary write request are members of the community of interest associated with the one of the plurality of encryption keys used in the write requests.

7. The system of claim 6, wherein the security group definition is editable by a security group administrator different from the security administrator.

8. The system of claim 6, wherein the security administrator is a domain administrator.

9. The system of claim 6, wherein the secure storage appliance is located within a domain, and wherein the security group corresponds to the users able to access the domain.

10. A method of accessing administrative settings in a secure storage appliance network utilizing cryptographically splitting data as it is stored and retrieved from storage devices, the method comprising:
receiving a request for administrative access to a volume managed by the secure storage appliance, the volume associated with a plurality of shares stored on a plurality of physical storage devices, the request including an identifier of an administrative user;
checking an administrative access level to determine access rights of the administrative user;
responding to the request for administrative access based on an outcome of checking the administrative access level; and
generating a log record of the received request for administrative access;

wherein the administrative user lacks access rights to a second volume different from the volume associated with a share stored on the plurality of physical storage devices;

wherein the cryptographically splitting data utilize a plurality of encryption keys to create a plurality of separate community of interest data sets in which the primary write requests and corresponding plurality of secondary write request are members of the community of interest associated with the one of the plurality of encryption keys used in the write requests.

11. The method of claim 10, wherein responding to the request for administrative access includes, upon determining that the administrative user has sufficient access rights to the volume, providing administrative access to the volume to the administrative user.

12. The method of claim 10, wherein responding to the request for administrative access includes, upon determining that the administrative user lacks sufficient access rights to the volume, denying administrative access to the volume to the administrative user.

13. The method of claim 10, wherein a second administrative user has an associated administrative access level sufficient to allow administrative access to the second volume to the second administrative user.

14. The method of claim 10, further comprising allowing a security administrator to edit the access rights of the administrative user.

15. The method of claim 10, wherein the security administrator lacks at least one of the access rights associated with the administrative user.

16. The method of claim 10, further comprising allowing an audit administrator to view the log record.

17. The method of claim 10, wherein the request for administrative access includes a request to perform an administrative function of the secure storage appliance.

18. The method of claim 17, wherein the administrative access level defines administrative functions allowable to the administrative user.

19. The method of claim 18, wherein the administrative functions include editing cryptographic settings, viewing audit logs, editing volume settings, editing user group settings, accessing encryption keys, and defining administrative access levels.

20. The method of claim 10, wherein checking an administrative access level to determine access rights of the administrative user is based on the identifier of the administrative user.

* * * * *